US009374568B2

(12) United States Patent
Maruyama et al.

(10) Patent No.: US 9,374,568 B2
(45) Date of Patent: Jun. 21, 2016

(54) IMAGE PROCESSING APPARATUS, IMAGING APPARATUS, AND IMAGE PROCESSING METHOD

(71) Applicants: Go Maruyama, Kanagawa (JP); Ryosuke Kasahara, Kanagawa (JP); Taro Sawaki, Kanagawa (JP)

(72) Inventors: Go Maruyama, Kanagawa (JP); Ryosuke Kasahara, Kanagawa (JP); Taro Sawaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 57 days.

(21) Appl. No.: 14/492,479

(22) Filed: Sep. 22, 2014

(65) Prior Publication Data

US 2015/0092080 A1 Apr. 2, 2015

(30) Foreign Application Priority Data

Sep. 30, 2013 (JP) .................................. 2013-204897

(51) Int. Cl.
H04N 9/73 (2006.01)
H04N 5/357 (2011.01)
H04N 5/232 (2006.01)
H04N 9/04 (2006.01)

(52) U.S. Cl.
CPC ........... H04N 9/735 (2013.01); H04N 5/23206 (2013.01); H04N 5/3572 (2013.01); H04N 9/045 (2013.01)

(58) Field of Classification Search
CPC . H04N 5/23206; H04N 5/3572; H04N 9/045; H04N 9/73; H04N 9/735
See application file for complete search history.

(56) References Cited

U.S. PATENT DOCUMENTS

| 2003/0222998 | A1* | 12/2003 | Yamauchi | G06T 3/4015 348/262 |
| 2010/0225759 | A1 | 9/2010 | Mathieu | |
| 2011/0273611 | A1 | 11/2011 | Matsusaka et al. | |
| 2012/0069237 | A1* | 3/2012 | Kishine | H04N 9/045 348/336 |
| 2012/0133801 | A1* | 5/2012 | Sekine | H04N 5/217 348/241 |
| 2012/0274798 | A1* | 11/2012 | Takahashi | H04N 9/735 348/222.1 |
| 2013/0050540 | A1* | 2/2013 | Kano | H04N 9/045 348/241 |

FOREIGN PATENT DOCUMENTS

| JP | 2000013808 A | * | 1/2000 |
| JP | 2010183246 A | * | 8/2010 |
| JP | 2010-213274 | | 9/2010 |
| JP | 2012-049759 | | 3/2012 |
| JP | 2012065187 A | * | 3/2012 |

(Continued)

OTHER PUBLICATIONS

Machine Translation JP2010-183246 to Tanabe published Aug. 2010.*

*Primary Examiner* — Daniel M Pasiewicz
(74) *Attorney, Agent, or Firm* — Oblon, McClelland, Maier & Neustadt, L.L.P.

(57) ABSTRACT

An image processing apparatus comprises: a white-balance processing unit that multiplies a first pixel that includes a plurality of colors constituting a pickup image that is picked up by an imaging unit by a gain value according to the colors and thereby generates a second pixel; a value adjusting unit that generates a third pixel by maintaining the second pixel that is equal to or smaller than a predetermined value out of the second pixel as it is, and by replacing, with the predetermined value, the second value that is larger than the predetermined value out of the second pixel; and a restoration processing unit that restores, by a restoration filter, resolution that has been reduced due to an optical system, on the third pixel.

13 Claims, 14 Drawing Sheets

(56) References Cited

FOREIGN PATENT DOCUMENTS

| JP | 2012-113311 | | | 6/2012 |
|----|----|----|----|----|
| JP | 2012114849 | A | * | 6/2012 |
| JP | 2013051598 | A | * | 3/2013 |
| JP | 2013-162369 | | | 8/2013 |
| JP | 2015-5881 | A | | 1/2015 |

* cited by examiner

FIG.13

| a11 | 0 | a12 | 0 | a13 |
|-----|---|-----|---|-----|
| 0   | 0 | 0   | 0 | 0   |
| a21 | 0 | a22 | 0 | a23 |
| 0   | 0 | 0   | 0 | 0   |
| a31 | 0 | a32 | 0 | a33 |

SUBJECT PARTIAL IMAGE 211

| A11 | A12 | A13 | A14 | A15 |
|-----|-----|-----|-----|-----|
| A21 | A22 | A23 | A24 | A25 |
| A31 | A32 | A33 | A34 | A35 |
| A41 | A42 | A43 | A44 | A45 |
| A51 | A52 | A53 | A54 | A55 |

$*$ (CONVOLUTION)

INVERSE CONVERSION FILTER 201

| a11 | 0 | a12 | 0 | a13 |
|-----|---|-----|---|-----|
| 0   | 0 | 0   | 0 | 0   |
| a21 | 0 | a22 | 0 | a23 |
| 0   | 0 | 0   | 0 | 0   |
| a31 | 0 | a32 | 0 | a33 |

$=$

A11×a11+A12×0+A13×a12+A14×0+A15×a13
+A21×0+A22×0+A23×0+A24×0+A25×0
+A31×a21+A32×0+A33×a22+A34×0+A35×a23
+A41×0+A42×0+A43×0+A44×0+A45×0
+A51×a31+A52×0+A53×a32+A54×0+A55×a33

...EQ. 1

(a)

(b)

(a)

(b)

(c)

(a)

(b)

(c)

(a)

(b)

(c)

(a)

(b)

(c)

IMAGE PROCESSING APPARATUS, IMAGING APPARATUS, AND IMAGE PROCESSING METHOD

CROSS-REFERENCE TO RELATED APPLICATIONS

The present application claims priority to and incorporates by reference the entire contents of Japanese Patent Application No. 2013-204897 filed in Japan on Sep. 30, 2013.

BACKGROUND OF THE INVENTION

1. Field of the Invention

The present invention relates to an image processing apparatus, an imaging apparatus, and an image processing method.

2. Description of the Related Art

In recent years, with development of digitalization of information, development of digitalization in a field of imaging apparatuses is also significant. Particularly, in imaging apparatuses represented by digital cameras, a solid image pickup device is used in place of conventional films for an imaging surface. As solid image pickup device (hereinafter, simply image pickup device), a charge coupled device (CCD) sensor or a complementary metal oxide semiconductor (CMOS) sensor, or the like is used.

As described, an imaging apparatus using an image pickup device captures and extracts light from a subject by an optical system by converting the light into electric signals by a solid image pickup device. Such an imaging apparatus includes a video camera, a barcode reader, a mobile phone, a mobile information terminal (PDA: personal digital assistant), an industrial camera, and the like, besides a digital camera.

As the imaging apparatus described above, there is an imaging apparatus that is used for a purpose supporting so called extended depth of field (EDoF) that extends depth of field by inserting a phase plate in the optical system. A depth of field is a distance range of allowable distance in an optical axis direction of a lens considered as focused on a subject at a certain distance from the lens of a camera. The phase plate inserted in the optical system has a function of giving a point spread function (PSF) to incident light of a subject to an image pickup device, and makes an image captured by the image pickup device blur but uniform in a deep depth of field. Therefore, the image made blur by the phase place is necessary to be corrected so as to be given a predetermined modulation transfer function (MTF). To restore such an image made blur by a phase plate, an inverse conversion processing of the point spread function is performed to improve MTF. Thus, the image is restored into a high resolution image.

Moreover, an image pickup device in a color camera as an imaging apparatus, sensitivity of detecting light corresponding to G (green) is highest among R (red), G (green), and B (blue), and if an image detected (captured) by the image pickup device is displayed as it is, the image tends to be a greenish image as a whole. Correction performed on such an image is white balance processing. The white balance processing is to correct variations in sensitivity for R, G, and B of an image pickup device, and is processing to adjust pixels by giving an appropriate gain to R, G, B pixels and give correction so that a white subject is displayed white.

As an imaging apparatus that performs restoration processing to restore an image that has been made blur by an optical system by performing such white balance processing, an imaging apparatus that performs restoration processing on a Y signal of a pixel after giving a white balance gain has been proposed (Japanese Patent Application Laid-open No. 2012-049759).

Furthermore, the image pickup device has a limit value maximum value) in a detectable light amount, and pixels to which an amount of light equal to or more than the light amount enters all take the same value (maximum value) and an accurate light amount cannot sometimes be detected. Particularly, as described above, because the device for detecting G (green) has high sensitivity among image pickup devices, an image that is imaged when light corresponding to G (green) enters in an amount equal to or more than the maximum detectable amount is to be unable to be restored properly by the inverse conversion processing. This is especially problematic when the image pickup device is a color camera, and such a problem occurs that a false color is produced when an accurate light amount is detected and restoration is also done properly for one color (for example, R (red) or B (blue)), while an accurate light amount is not detected and restoration is not done properly for another color (for example, G (green)).

However, the white balance processing in the imaging apparatus described in Japanese Patent Application Laid-open No. 2012-049759 gives a gain of 0 for colors except for a special color, and differs from general white balance processing to correct an entire image. Moreover, a method to solve the problem of producing a false color as one color (for example, G (green) is saturated and an accurate light amount is not detected and restoration is not done properly is not described therein.

In view of the above problem, there is a need to provide an image processing apparatus, an imaging apparatus, and an image processing method in which production of a false color is suppressed at the time of image processing.

SUMMARY OF THE INVENTION

It is an object of the present invention to at least partially solve the problems in the conventional technology.

According to the present invention, there is provided an image processing apparatus comprising: a white-balance processing unit that multiplies a first pixel that includes a plurality of colors constituting a pickup image that is picked up by an imaging unit by a gain value according to the colors and thereby generates a second pixel; a value adjusting unit that generates a third pixel by maintaining the second pixel that is equal to or smaller than a predetermined value out of the second pixel as it is, and by replacing, with the predetermined value, the second value that is larger than the predetermined value out of the second pixel; and a restoration processing unit that restores, by a restoration filter, resolution that has been reduced due to an optical system, on the third pixel.

The present invention also provides an imaging apparatus comprising: an optical system that makes reduction in resolution uniform in a predetermined range on an optical axis; an imaging unit; and an image processing apparatus, wherein the image processing apparatus comprises; a white-balance processing unit that multiplies a first pixel that includes a plurality of colors constituting a pickup image that is picked up by an imaging unit by a gain value according to the colors and thereby generates a second pixel, a value adjusting unit that generates a third pixel by maintaining the second pixel that is equal to or smaller than a predetermined value out of the second pixel as it is, and by replacing, with the predetermined value, the second value that is larger than the predetermined value out of the second pixel, and a restoration processing unit that restores, by a restoration filter, resolution that has been reduced due to an optical system, for the third pixel.

The present invention also provides an image processing method comprising: performing white balance processing that multiplies a first pixel that includes a plurality of colors constituting a pickup image that is picked up by an imaging unit by a gain value according to the color and thereby generates a second pixel; performing value adjustment processing that generates a third pixel by maintaining the second pixel that is equal to or smaller than a predetermined value out of the second pixel as it is and by replacing, with the predetermined value, the second value that is larger than the predetermined value out of the second pixel out of the second pixel; and performing restoration processing that restores, by a restoration filter, resolution that has been reduced due to an optical system, on the third pixels.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 illustrates an example of a configuration of an inverse conversion filter;

FIG. 14 is an explanatory diagram of filter processing by the inverse conversion filter;

DETAILED DESCRIPTION OF THE PREFERRED EMBODIMENTS

An embodiment of an image processing apparatus, an imaging apparatus, and an image processing method according to the present invention are explained in detail below with reference to the drawings. The present invention is not limited to the following embodiment, and components in the following embodiment include one that can be easily thought of by a person skilled in the art, one that is practically identical, and one that is within an equivalent range. Furthermore, within a range of not departing from the gist of the following embodiment, various omission, replacement, and alteration of the components may be made.

Entire Configuration of Imaging System

Figure 1:
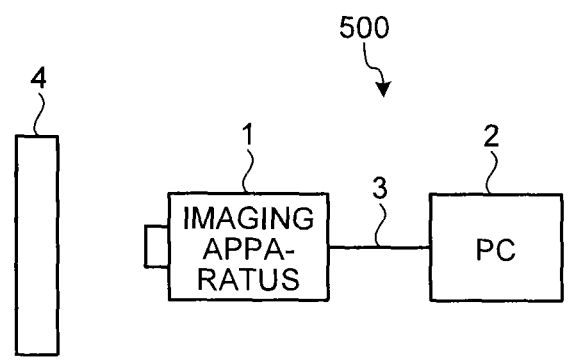
FIG. 1 is a block diagram showing an example of an entire configuration of an imaging system according to an embodiment of the present invention.

FIG. 1 is a block diagram showing an example of an entire configuration of an imaging system according to the embodiment. A configuration of an imaging system 500 of the embodiment is explained referring to FIG. 1.

As shown in FIG. 1, the imaging system 500 includes an imaging apparatus 1 and a personal computer (PC) 2. The imaging apparatus 1 and the PC 2 are connected by a communication cable 3 such as an Ethernet (registered trademark) cable, so as to able to communicate with each other.

The imaging apparatus 1 picks up a subject 4 by converting light emitted from the subject 4 into an electric signal, performs various kinds of processing on data of the pickup image (hereinafter, simply "image"), and transmits the processed image to the PC 2 through the communication cable 3. The PC 2 performs predetermined processing on the image received from the imaging apparatus 1.

For example, the imaging apparatus 1 picks up a barcode that is attached to a product moving on a production line, and transmits an image of the barcode to the PC 2. The PC 2 reads and analyzes the information of the barcode from the received image.

Although the imaging system 500 is a wired communication system in which the imaging apparatus 1 and the PC 2 communicate data through the communication cable 3 as shown in FIG. 1, it is not limited thereto. For example, the imaging apparatus 1 and the PC 2 may be enabled to communicate data with each other by a wireless communication mode such as wireless fidelity (Wi-Fi) (registered trademark).

Moreover, when the imaging system 500 is used in a production line, the imaging system 500 may take a configuration in which the PC 2 is connected to a programmable logic controller (PLC) and the like so as to be able to communicate with each other. In this case, as operation of the imaging system 500, following operation can be considered as an example. The imaging apparatus 1 picks up a barcode that is attached on a product moving on a production line, and transmits an image of the barcode to the PC 2. The PC 2 determines a product number of the product moving on the production line from the received image of the barcode. When the determined product number is not consistent with a product number to which the production line has been changed-over, the PC 2 transmits a signal indicating that the product for which the product number has been determined is of a different product number, to the PLC. When receiving the signal indicating a product of a different product number from the PC 2, the PLC removes the product from the production line, or lights a warning lamp and controls the operation of the production line to stop the production line.

Configuration of Information Processing Apparatus

Figure 2:
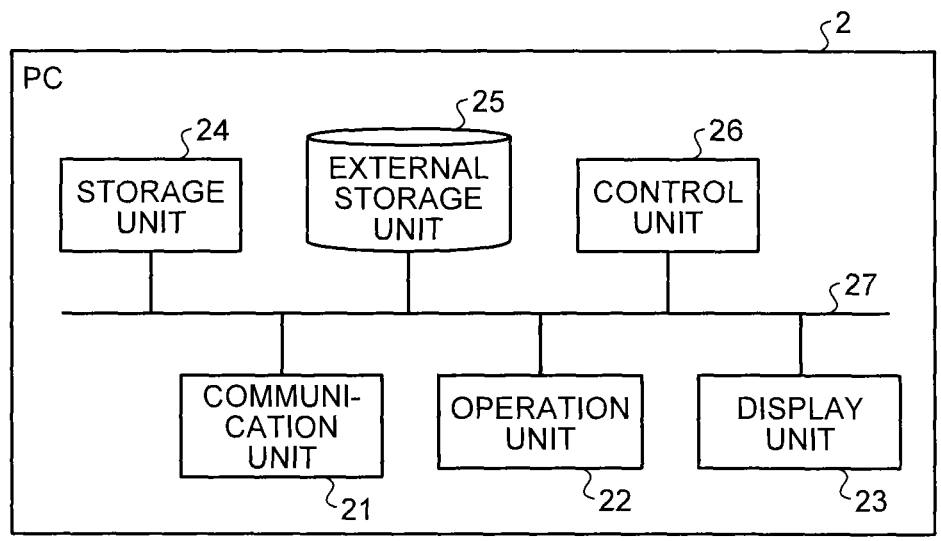
FIG. 2 is a block diagram showing an example of a configuration of an information processing apparatus of the embodiment.

FIG. 2 is a block diagram showing an example of a configuration of an information processing apparatus of the embodiment. The PC 2 that is an example of the information processing apparatus is explained referring to FIG. 2.

As shown in FIG. 2, the PC 2 as an example of the information processing apparatus includes a communication unit 21, an operation unit 22, a display unit 23, a storage unit 24, an external storage unit 25, and a control unit 26. The above respective components are connected through a bus 27, and are enabled to communicate with each other.

The communication unit 21 is a device that communicates with the imaging apparatus 1 through the communication cable 3. The communication unit 21 is implemented by, for example, a communication device such as a network interface card (NIC). A communication protocol of the communication unit 21 is implemented by a transmission control protocol (TCP)/Internet protocol (IP), a user datagram protocol (UDP)/IP, or the like.

The operation unit 22 is a device that is operated by a user to make input to the control unit 26 to perform a predetermined processing. The operation unit 22 is implemented by, for example, a mouse, a keyboard, a numeric keypad, a touch panel, or an operation input function of the touch panel.

The display unit 23 is a device that displays an image of an application that is executed by the control unit 26, and the like. The display unit 23 is implemented by, for example, a cathode ray tube (CRT) display, a liquid crystal display, a plasma display, an organic electroluminescence display, or the like.

The storage unit 24 is a device that stores various kinds of programs that are executed by the PC 2, data that is used for various kinds of processing performed by the PC 2, and the like. The storage unit 24 is implemented by, for example, a storage device such as a read only memory (ROM) and a random access memory (RAM).

The external storage unit 25 is a storage device that accumulates and stores images, programs, font data, and the like. The external storage unit 25 is implemented by, for example, a storage device such as a hard disk drive (HDD), a solid state drive, (SSD), an optical disk, and a magneto-optical disk (MO).

The control unit 26 is a device that controls operation of each component of the PC 2. The control unit 26 is implemented by, for example, a central processing unit (CPU) and an application specific integrated circuit (ASIC).

Configuration of Imaging Apparatus

Figure 3:
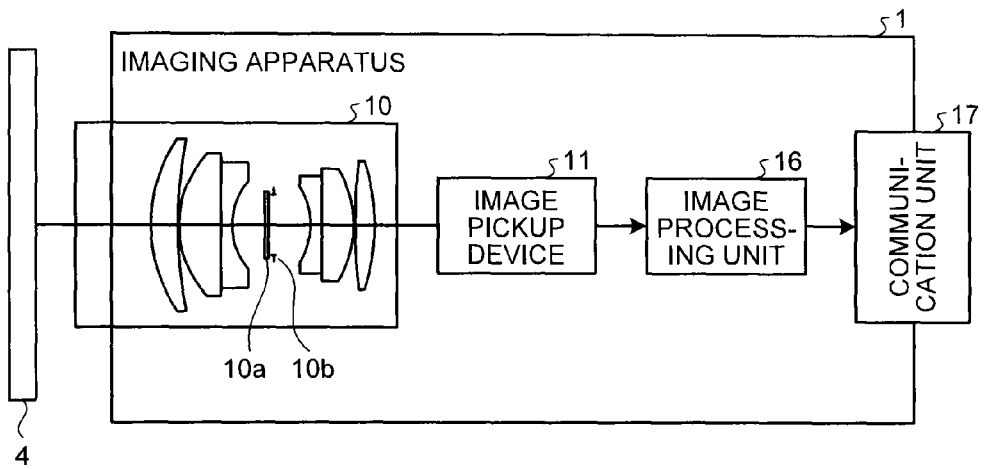
FIG. 3 is a block diagram showing an example of a configuration of an imaging apparatus according to the embodiment.

FIG. 3 is a block diagram showing an example of a configuration of the imaging apparatus according to the embodiment. The imaging apparatus 1 of the present embodiment is explained referring to FIG. 3.

As shown in FIG. 3, the imaging apparatus 1 includes a lens unit 10, an image pickup device 11, an image processing unit 16, and a communication unit 17.

The lens unit 10 is a unit that collects light from the subject 4, and forms an image with respect to the image pickup device 11. The lens unit 10 is implemented by an optical system that is constituted of one or more pieces of lenses. The lens unit 10 includes a phase plate 10a and an aperture 10b. The subject 4 is, for example, a person, an object to be supervised, a barcode, a two-dimensional code, a character string, and the like.

The phase plate 10a has an action of giving an aberration to incident light to the lens unit 10. As a result, the phase plate 10a exerts an action of adding a point spread function to light entering into the image pickup device 11, and makes an image picked up by the image pickup device 11 blur (reduction in resolution) but uniform in blurriness in a predetermined depth of field.

The aperture 10b is a member to adjust an amount of light that enters into the lens unit 10 desirably, and is arranged adjacent to the phase plate 10a.

The image pickup device 11 is a solid image pickup device that convers light incident form a subject to the lens unit 10 into an electric signal, thereby imaging the subject 4 to form an image. The image pickup device 11 outputs pixels (first pixel) that constitute the image picked up by each detecting device constituting the solid image pickup device. The image pickup device 11 is implemented by, for example, a CCD sensor, a CMOS sensor, or the like.

The image processing unit 16 is a device that generates an image on which image processing is performed, from an image that is output from the image pickup device 11.

The communication unit 17 is a device that communicates with the PC 2 through the communication cable 3. The communication unit transmits, for example, an image that is output by the image processing unit 16 to the PC 2. The communication unit 17 is implemented by, for example, a communication device such as an NIC. The communication protocol of the communication unit 17 is implemented by, for example, TCP/IP, UDP/IP, or the like.

Configuration and Operation of Image Processing Unit

Figure 4:
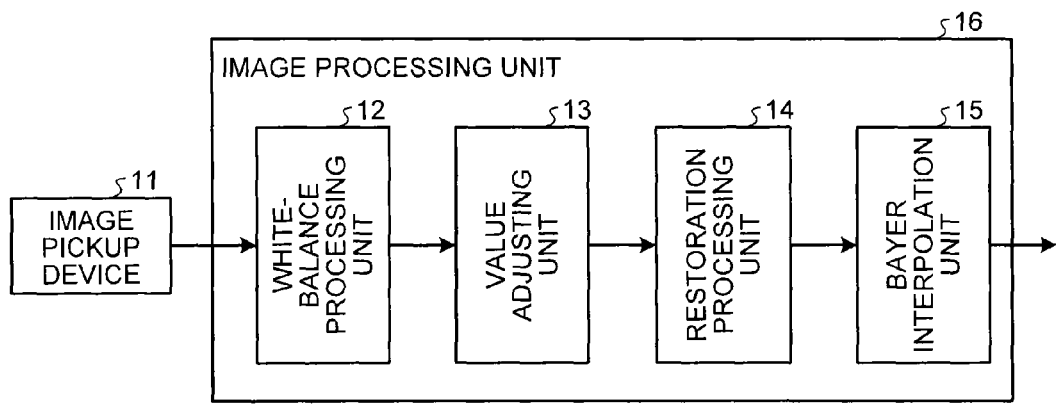
FIG. 4 is a block diagram showing an example of a configuration of an image processing unit of the imaging apparatus according to the embodiment.
Figure 5:
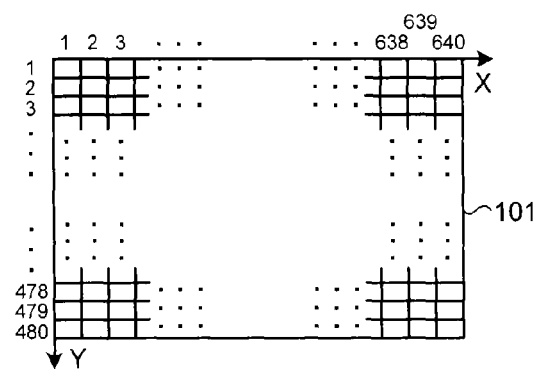
FIG. 5 illustrates an example of a detection image that is picked up by the image pickup device.
Figure 6:
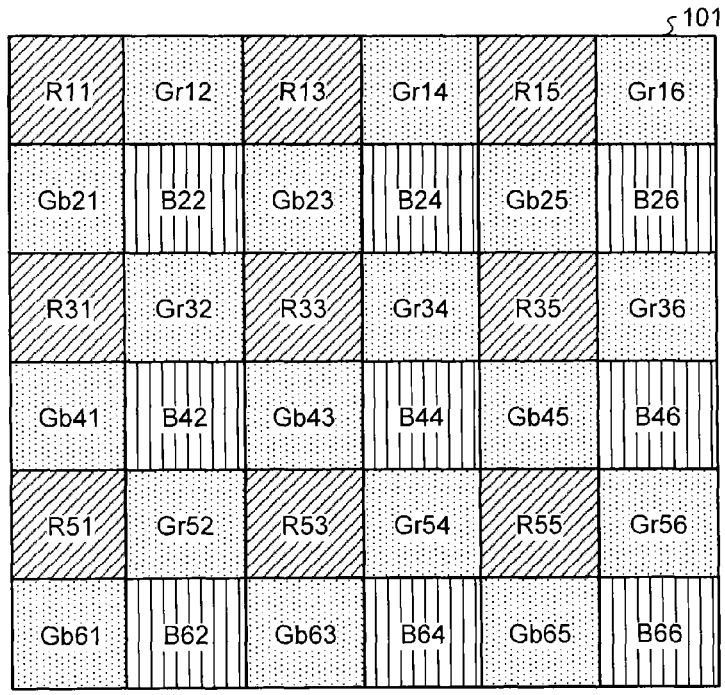
FIG. 6 illustrates an example of a configuration of pixels of a detection image that is picked up by the image pickup device.

FIG. 4 is a block diagram showing an example of a configuration of the image processing unit of the imaging apparatus according to the embodiment. FIG. 5 illustrates an example of a detection image that is picked up by the image pickup device. FIG. 6 illustrates an example of a configuration of pixels of a detection image that is picked up by the image pickup device. A configuration of the image processing unit 16 of the imaging apparatus 1 of the present embodiment is explained referring to FIG. 4.

Explanation is given below supposing that the image pickup device 11 forms and outputs images in the VGA mode. Specifically, the image pickup device 11 detects a detection image 101 that is an image constituted of pixels arranged in a 640×480 matrix, as shown in FIG. 5, by 640 pieces and 480 pieces of detecting devices in an X direction and a Y direction, respectively.

The image pickup device 11 is configured with detecting devices that detect R (red) components of light, detecting devices that detect G (green) components, and detecting devices that detect B (blue) components regularly arranged in a so-called Bayer arrangement. The Bayer arrangement is an arrangement in which sets of 2×2 detecting devices (2×2 pixels in the case of an image) are regularly arranged. The detection image 101 that is imaged by the image pickup device 11 in which the detecting devices are arranged in the Bayer arrangement is shown in FIG. 6.

As shown in FIG. 6, the detection image 101 is to be an image that is constituted of pixels arranged in the Bayer arrangement as a result of being imaged by the image pickup device 11 in which the detecting devices are arranged in the Bayer arrangement. In the example shown in FIG. 6, the detection image 101 is configured with 2×2 pixels to be an arranging unit that are arranged such that an upper left pixel is R (red), an upper right and a lower left pixels are G (green), and a lower right pixel is B (blue) when viewed on the sheet. As shown in FIG. 6, out of the two G (green) pixels included in this 2×2 pixels, the upper right pixel is referred to as "Gr", and the lower left pixel is referred to as "Gb". The detection image 101 is configured with such 2×2 pixels arranged regularly to be 640×480 pixels as a whole. As shown in FIG. 6, in the detection image 101, for example, an R (red) pixel at the fifth in the X direction and the third in the Y direction is referred to as "R35". In the detection image 101, for example a G (green) (Gb) pixel at the third in the X direction and the second in the Y direction is referred to as "Gb23". In the detection image 101, for example, a B (blue) pixel at the second in the X direction and the sixth in the Y direction is referred to as "B62". Moreover, in the detection image 101, simply, a pixel at the X-th in the X direction and at the Y-th in the Y direction is referred to as a pixel of (X, Y).

Although it is supposed that an image that is detected by the image pickup device 11 is a VGA image in the size of 640× 480, it is not limited thereto, and may be an image in a different size.

As shown in FIG. 4, the image processing unit 16 includes a white-balance processing unit 12 (white-balance processing unit), a value adjusting unit (value adjusting unit) 13, a restoration processing unit (restoration processing unit) 14, and a Bayer interpolation unit 15.

The white-balance processing unit 12 performs white balance processing in which variations in sensitivity among detecting devices of R (red), G (green), and B (blue) of the image pickup device 11 are corrected, and an appropriate gain value is given to pixels of R, G, and B to output pixels (second pixel) thereby adjusted. Specific configuration and operation of the white-balance processing unit 12 are explained later based on FIG. 7 and FIG. 8.

When a value of a pixel is larger than a maximum value (predetermined value) of a detectable light amount (for example, a range of 0 to 255) of the image pickup device 11, the value adjusting unit 13 performs value adjustment processing in which a value of the pixel is replaced with the maximum value, to obtain a new pixel (third pixel), which is the maximum value. Specific configuration and operation of the value adjusting unit 13 are explained later based on FIG. 9.

The restoration processing unit 14 performs restoration processing using an inverse conversion filter (restoration filter), which is a finite impulse response (FIR) filter, on a process object image that is obtained by performing the white balance processing by the white-balance processing unit 12 and the value adjustment processing by the value adjusting unit 13 on a an image that has been imaged by the image pickup device 11 and to which a point spread function has been given to be blur. Specific configuration and operation of the restoration processing unit 14 are explained later based on FIGS. 10 to 15.

The Bayer interpolation unit 15 converts a restoration image in the Bayer arrangement subjected to the restoration processing by the restoration processing unit 14 into an RGB signal by Bayer interpolation processing. Specific operation of the Bayer interpolation unit 15 is described later.

Configuration and Operation of White-balance Processing Unit

Figure 7:
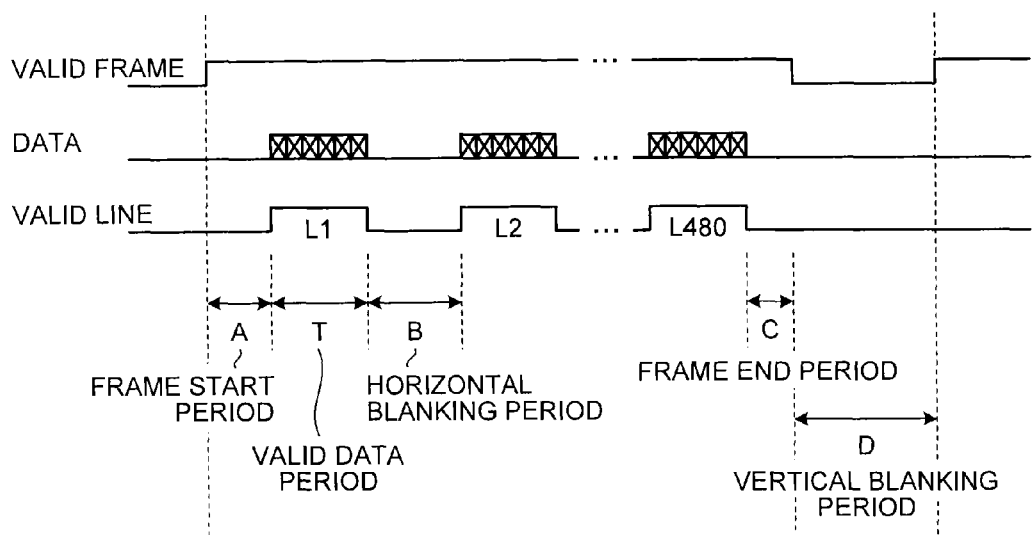
FIG. 7 is a timing chart indicating operation of inputting an image that is output by the image pickup device to a white-balance processing unit.
Figure 8:
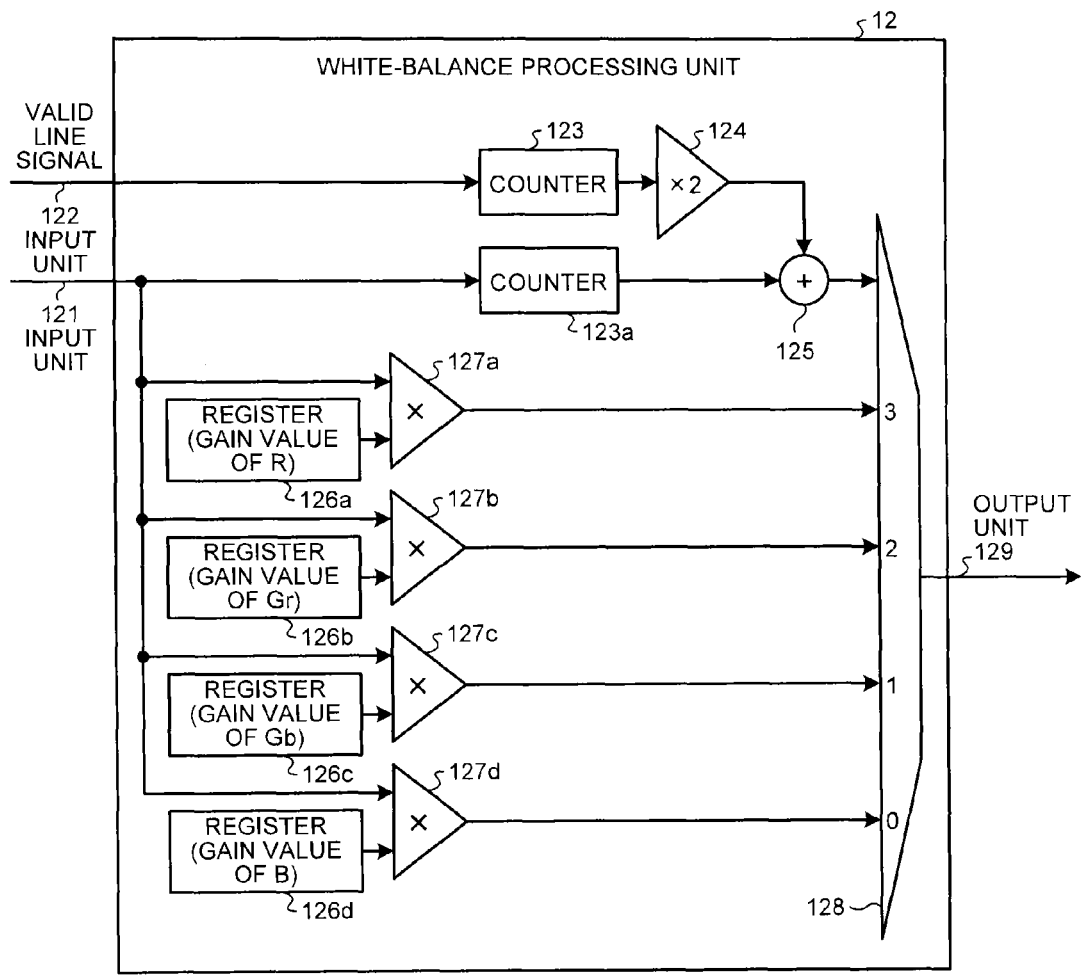
FIG. 8 is a block diagram showing an example of a configuration of the white-balance processing unit of the image processing unit of the embodiment.

FIG. 7 is a timing chart indicating operation of inputting an image that is output by the image pickup device to the white-balance processing unit. FIG. 8 is a block diagram showing an example of a configuration of the white-balance processing unit of the image processing unit of the embodiment. A configuration and operation of the white-balance processing unit 12 of the imaging apparatus of the present invention are explained with reference to FIG. 8.

First, referring to FIG. 5 and FIG. 7, operation of outputting a detection image that is imaged by the image pickup device 11 is explained. The image pickup device 11 outputs, while scanning detected pixels in each horizontal line in the X direction sequentially, pixels included in one horizontal line. Specifically, the image pickup device 11 outputs pixels included in the first horizontal line in the Y direction, from a first pixel to the 640th pixel in the X direction sequentially. The image pickup device 11 performs the above operation until pixels included in the 480th horizontal line in the Y direction are output.

The above operation is explained based on the timing chart shown in FIG. 7. As shown in FIG. 7, the image pickup device 11 outputs pixels corresponding to one frame, that is, one image, when a valid frame signal is on. In the image pickup device 11, after the valid frame signal becomes an on state, it goes through a frame start period A, and a valid line signal L1 to allow output of pixels in the first horizontal line in the Y direction is turned on. The image pickup device 11 scans the first horizontal line in the Y direction during a valid data period T when the valid line signal L1 is on, and sequentially outputs the 1st to the 640th pixels in the X direction (pixels at (1, 1) to (640, 1)) included in the horizontal line. After the pixels in the first horizontal line in the Y direction are output by the image pickup device 11, the valid line signal L1 is turned off.

In the image pickup device 11, after the valid line signal L1 becomes an off state, it goes through a horizontal blanking period B, a valid line signal L2 to allow output of pixels in the second horizontal line in the Y direction is turned on. The image pickup device 11 scans the second horizontal line in the Y direction during the valid data period T when the valid line signal L2 is on, and sequentially outputs the 1st to 640th pixels in the X direction (pixels at (1, 2) to (640, 2)) included in the horizontal line. After the pixels in the second horizontal line in the Y direction are output by the image pickup device 11, the valid line signal L2 is turned off.

The image pickup device 11 performs the above operation until the 1st to 640th pixels in the X direction included in the 480th horizontal line in the Y direction are output during the valid data period T is on when a valid line signal L480 is on. In the image pickup device 11, after a valid line signal L480 becomes an off state, it goes through a frame end period C, and then the valid frame signal is turned off. By the above operation, output of pixels corresponding to one frame by the image pickup device 11 ends. Furthermore, in the image pickup device 11, after the valid frame signal becomes an off state, it goes through a vertical blanking period D, and the valid frame signal again becomes an on state, and output of pixels corresponding to next one frame is started.

The white-balance processing unit 12 includes counters 123, and 123a, a multiplier 124, a adder 125, registers 126a to 126d, multipliers 127a to 127d, and an output switch 128 as shown in FIG. 8. The white-balance processing unit 12 receives input of pixels that are output from the image pickup device 11 through an input unit 121, and output pixels subjected to the white balance processing through an output unit 129. Moreover, the white-balance processing unit 12 receives input of the valid line signals L1 to L480 through the input unit 122.

As shown in FIG. 8, the input unit 121 is connected to respective input sides of the counter 123a and the multiplier 127a to 127d. The input side of the counter 123 is connected to an input unit 122, and an output side of the counter 123 is connected to an input side of the multiplier 124. Respective output sides of the multiplier 124 and the counter 123a are connected to an input side of the adder 125. The registers 126a to 126d are connected to respective input sides of the multipliers 127a to 127d. The output of the adder 125 is connected to an input side of the output switch 128. Output sides of the multipliers 127a to 127d are connected to terminals "3" to "0" on an input side of the output switch 128, respectively. An output side of the output switch 128 is connected the output unit 129.

Next, the white balance processing that is performed, in the white-balance processing unit 12, on pixels output from the image pickup device 11 is explained referring to FIG. 8. The counter 123 receives the valid line signal described above through the input unit 122, and detects a rise of the valid line signal. When a rise is detected, the counter 123 switches, when the count value held therein is "0", to "1" to output, and switches, when the count value held therein is "1", to "0" to output. Note that the counter 123 has the count value of "0" as an initial state. Specifically, when a rise of the valid line signal L1 is detected, the counter 123 switches the count value from "0" to "1", and thereafter, when a rise of the valid line signal L2 is detected, the counter 123 switches the count value form "1" to "0". That is, the counter 123 outputs "1" when the valid line signal of an odd line in the Y direction in the detection image 101 (see FIG. 5) is received from the image pickup device 11, and outputs "0" when the valid signal line of an even line thereof is received. The multiplier 124 outputs "0" when "0" is received from the counter 123, and outputs, when "1" is received, "2" that is obtained by doubling the received value.

The counter 123a receives pixels that are output from the image pickup device 11 through the input unit 121, and upon receiving new pixels, switches, when the count value held therein is "0", to "1" to output the pixels, or switches, when the count value is "1", to "0", to output the pixels. Note that the counter 123 has the count value of "0" as an initial state. Specifically, when an odd numbered pixel in the X direction included in a specific horizontal line in the detection image 101, the counter 123a outputs "1" and when an even numbered pixel is received, outputs "0" to the adder 125.

That is, when the white-balance processing unit 12 is receiving a pixel included in an odd numbered line in the Y direction of the detection image 101, and the pixel is an odd numbered pixel in the X direction included in the odd numbered line, the adder 125 receives input of "2" from the multiplier 124, and input of "1" from the counter 123a, to output "3" that is obtained by adding the both values, to the output switch 128. This corresponds to a case in which the white-balance processing unit 12 is receiving input of an R (red) pixel from the image pickup device 11 through the input unit 121.

Moreover, when the white-balance processing unit 12 is receiving a pixel included in an odd numbered line in the Y direction of the detection image 101, and the pixel is an even numbered pixel in the X direction included in the odd numbered line, the adder 125 receives input of "2" from the multiplier 124, and input of "0" from the counter 123a, to output "2" that is obtained by adding the both values, to the output switch 128. This corresponds to a case in which the white-balance processing unit 12 is receiving input of a Gr (green) pixel from the image pickup device 11 through the input unit 121.

Furthermore, when the white-balance processing unit 12 is receiving a pixel included in an even numbered line in the Y direction of the detection image 101, and the pixel is an odd numbered pixel in the X direction included in the even numbered line, the adder 125 receives input of "0" from the multiplier 124, and input of "1" from the counter 123a, to output "1" that is obtained by adding the both values, to the output switch 128. This corresponds to a case in which the white-balance processing unit 12 is receiving input of a Gb (green) pixel from the image pickup device 11 through the input unit 121.

Moreover, when the white-balance processing unit 12 is receiving a pixel included in an even numbered line in the Y direction of the detection image 101, and the pixel is an even numbered pixel in the X direction included in the even numbered line, the adder 125 receives input of "0" from the multiplier 124, and input of "0" from the counter 123a, to output "0" that is obtained by adding the both values, to the output switch 128. This corresponds to a case in which the white-balance processing unit 12 is receiving input of a B (blue) pixel from the image pickup device 11 through the input unit 121.

The multiplier 127a outputs a pixel input from the input unit 121, and a multiplied value by a gain value for white balance processing for an R (red) pixel stored in the register 126a. The multiplier 127b outputs a pixel input from the input unit 121, and a multiplied value by a gain value for white balance processing for a Gr (green) pixel stored in the register 126b. The multiplier 127c outputs a pixel input from the input unit 121, and a multiplied value by a gain value for white balance processing for a Gb (green) pixel stored in the register 126c. The multiplier 127d outputs a pixel input from the input unit 121, and a multiplied value by a gain value for white balance processing for a B (blue) pixel stored in the register 126d.

The output switch 128 switches outputs according to a value input from the adder 125. Specifically, when "3" is input from the adder 125, the output switch 128 outputs an R (red) pixel that is input to a terminal "3" on the input side and is multiplied by the gain value by the multiplier 127a, through the output unit 129. Moreover, when "2" is input from the adder 125, the output switch 128 outputs a Gr (green) pixel that is input to a terminal "2" on the input side and is multiplied by the gain value by the multiplier 127b through the output unit 129. Furthermore, when "1" is input from the adder 125, the output switch 128 outputs a Gb (green) pixel that is input to a terminal "1" on the input side and is multiplied by the gain value by the multiplier 127c through the output unit 129. Moreover, when "0" is input from the adder 125, the output switch 128 outputs a B (blue) pixel that is input to the terminal "1" on the input side and is multiplied by the gain value by the multiplier 127d through the output unit 129.

As described above, on the detection image 101 in the Bayer arrangement output from the image pickup device 11 and input to the white-balance processing unit 12, the white balance processing in which respective R (red), Gr (green), Gb (green), and B (blue) pixels are multiplied by gain values corresponding thereto is performed, to be output from the white-balance processing unit 12.

FIG. 8 indicates one example of a configuration of the white-balance processing unit 12, and it is not limited thereto. It may take any configuration as long as a similar action to the white balance processing performed by the white-balance processing unit 12 described above is exerted.

Furthermore, as described above, because the image pickup device 11 has the highest sensitivity in detecting light corresponding to G (green) among R (red), G (green), and B (blue), it is preferable that the gain values by which pixels of R (red) and B (blue) are multiplied be larger than the gain value by which a pixel of G (green) is multiplied.

Configuration and Operation of Value Adjusting Unit

Figure 9:
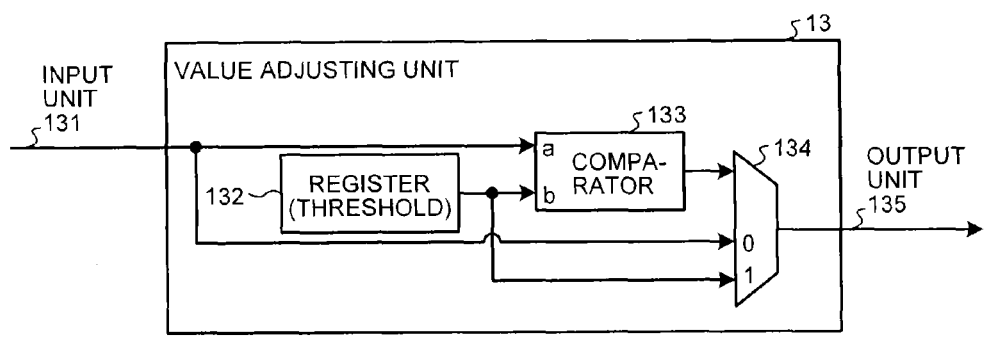
FIG. 9 is a block diagram showing an example of a configuration of a value adjusting unit of the image processing unit of the embodiment.

FIG. 9 is a block diagram showing an example of a configuration of the value adjusting unit of the image processing unit of the embodiment. A configuration and operation of the value adjusting unit 13 of the imaging apparatus 1 of the present embodiment are explained referring to FIG. 9.

The value adjusting unit 13 includes a register 132, a comparator 133, and an output switch 134, as shown in FIG. 9. The value adjusting unit 13 receives input of a pixel subjected to the white balance processing output from the white-balance processing unit 12, and outputs a pixel on which a value adjustment processing is performed from the output unit 135.

As shown in FIG. 9, the input unit 131 is connected to terminal a on an input side of the comparator 133, and to a terminal "0" on an input side of the output switch 134. The register 132 is connected to terminal b on the input side of the comparator 133, and to a terminal "1" on the input side of the output switch 134. An output side for the output switch 134 is connected to the output unit 135.

Next, the value adjustment processing performed by the value adjusting unit 13 on a pixel that is output from the white-balance processing unit 12 is explained referring to FIG. 9. The register 132 holds a maximum value (for example, 255) of a detectable light amount (for example, a range of 0 to 255) of the image pickup device 11 as a threshold used for threshold determination at the comparator 133. Pixels of an image subjected to the white balance processing output from the white-balance processing unit 12 are sequentially input to terminal "a" of the comparator 133 through the input unit 131. The threshold held by the register 132 is input to terminal "b" of the comparator 133. The comparator 133 performs threshold determination to compare a pixel input to terminal "a" and the threshold input to terminal "b", and outputs "1" to the output switch 134 when the pixel is larger than the threshold, and outputs "0" to the output switch 134 when the pixel is equal to or smaller than the threshold.

The output switch 134 switches outputs according to a value input from the comparator 133. Specifically, the output switch 134 outputs a value that is input to terminal "1" on the input side, that is, the threshold held by the register 132, through the output unit 135 when "1" is input from the comparator 133. Moreover, the output switch 134 outputs a value that is input to terminal "0" on the input side, that is, the pixel input from the input unit 131, through the output unit 135 when "0" is input from the comparator 133.

As described above, an image subjected to the white balance processing output from the white-balance processing unit 12 and input to the value adjusting unit 13 is subjected to the value adjustment processing in which a pixel is substituted by the threshold when the pixel is larger than then the threshold, and is subjected to the value adjustment processing in which a pixel is maintained as it is when the pixel is equal to or smaller than the threshold, and the image subjected to the value adjustment processing is output from the value adjusting unit 13.

FIG. 9 only indicates one example of a configuration of the value adjusting unit 13, and it is not limited thereto. It may take any configuration as long as a similar action to the value adjustment processing performed by the value adjusting unit 13 described above is exerted.

Moreover, although the threshold that is used in threshold determination by the comparator 133 described above is a maximum value of a detectable light amount of the image pickup device 11, it is not limited thereto, and it may be a predetermined value that is equal to or smaller than the maximum value.

Configuration and Operation of Restoration Processing Unit

Figure 10:
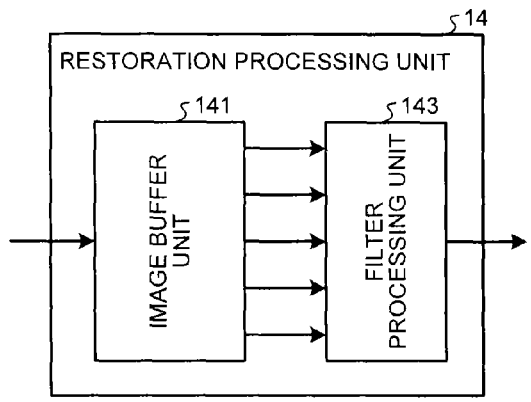
FIG. 10 is a block diagram showing an example of a configuration of a restoration processing unit of the image processing unit of the embodiment.

FIG. 10 is a block diagram showing an example of a configuration of the restoration processing unit of the image processing unit of the embodiment. A configuration and operation of the restoration processing unit 14 of the imaging apparatus 1 of the present embodiment are explained with reference to FIG. 10.

As shown in FIG. 10, the restoration processing unit 14 includes an image buffer unit 141, and a filter processing unit 143.

The image buffer unit 141 is a device that sequentially receives and buffers pixels output from the value adjusting unit 13. Specific configuration and operation of the image buffer unit 141 are described later based on FIG. 11.

The filter processing unit 143 performs predetermined filter processing on pixels output from the image buffer unit 141 by a filter circuit. In the present embodiment, filter processing to perform inverse conversion processing to correct blurriness on an image that is made blur by giving the point spread function by the action of the phase plate 10a is explained as the filter processing. Specific configuration and operation of the filter processing unit 143 are described later based on FIGS. 12 to 15.

Configuration and Operation of Image Buffer Unit 141

Figure 11:
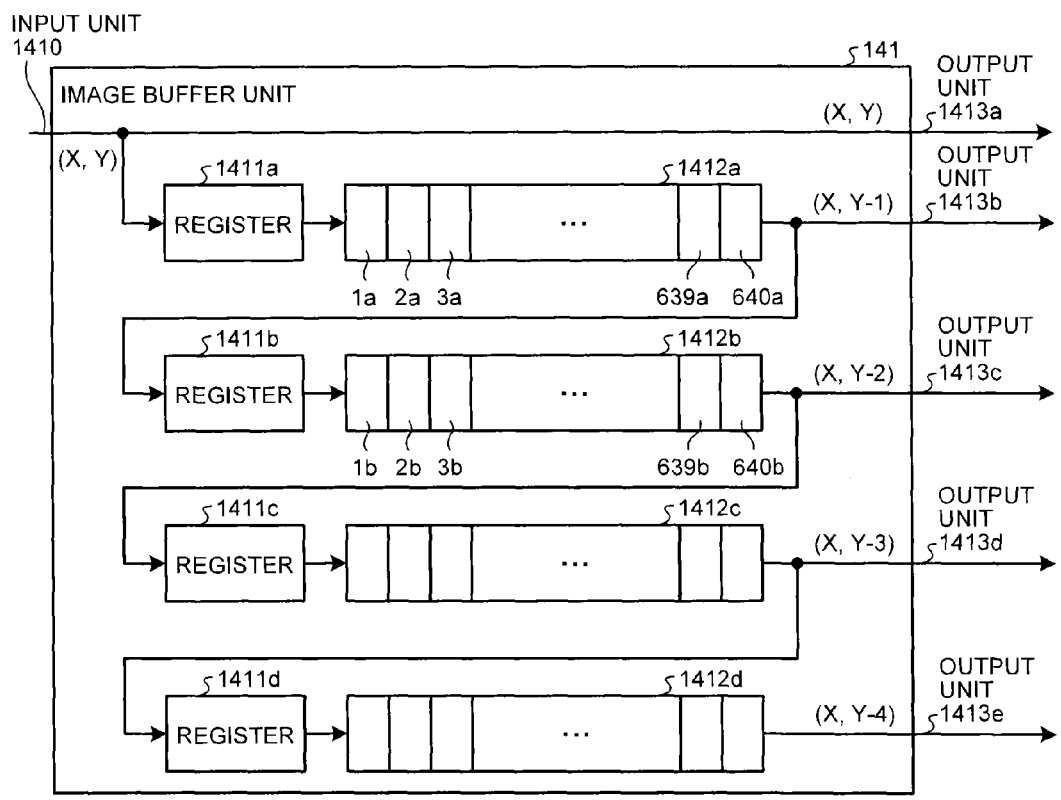
FIG. 11 is a block diagram showing an example of a configuration of an image buffer unit of the restoration processing unit of the embodiment.

FIG. 11 is a block diagram showing an example of a configuration of an image buffer unit of the restoration processing unit of the embodiment. A configuration and operation of the image buffer unit 141 of the restoration processing unit 14 are explained with reference to FIG. 7 and FIG. 11.

The image buffer unit 141 includes registers 1411a to 1411b, and line buffers 1412a to 1412d as shown in FIG. 11. The image buffer unit 141 receives, from an input unit 1410, a pixel that is output from the image pickup device 11, and outputs buffered pixel through output units 1413a to 1413e.

As shown in FIG. 11, an input side of the register 1411a is connected to the input unit 1410 and the output unit 1413a. Output sides of the registers 1411a to 1411d are connected to respective input sides of the line buffers 1412a to 1412d.

Next, buffer processing of a pixel output from the image pickup device 11 performed by the image buffer unit 141 is explained. The image buffer unit 141 receives input of a pixel that is output from the image pickup device 11 through the input unit 1410. Specifically, the image buffer unit 141 first outputs a pixel at (1, 1) that is input from the image pickup device 11 in the first horizontal line in the Y direction through the output unit 1413a, and stores the pixel in the register 1411a.

The image buffer unit 141 stores, in a storage area 1a of the line buffer 1412a, the pixel that has been stored in the register 1411a, at the next timing. The image buffer unit 141 then outputs a pixel at (2, 1) that is subsequently input from the image pickup device 11 through the output unit 1413a, and stores the pixel in the register 1411a.

The image buffer unit 141 shifts the pixel that has been stored in the storage area 1a to a storage area 2a of the line buffer 1412a to store the pixel therein, and stores, in the storage area 1a, the pixel that has been stored in the register 1411a at the next timing. The image buffer unit 141 then outputs a pixel at (3, 1) that is subsequently input from the image pickup device 11 through the output unit 1413a, and stores the pixel in the register 1411a.

By repeating the above operation, the image buffer unit 141 outputs pixels in the first horizontal line in the Y direction that are input from the image pickup device 11, through the output unit 1413a. At the same time, the image buffer unit 141 stores, in storage areas 639a to 1a of the line buffer 1412a, 1st to 639th pixels in the first horizontal line in the Y direction, respectively, and stores the 640th pixel in the register 1411a.

Subsequently, the image buffer unit 141 shifts the pixels stored in the storage areas 1a to 639a of the line buffer 1412a to the storage areas 2a to 640a to store the pixels therein, and stores, in the storage area 1a, the pixel that has been stored in the register 1411a. The image buffer unit 141 outputs the pixel at (1, 1) stored in the storage area 640a through the output unit 1413b, and stores the pixel in the register 1411b at the same time. The image buffer unit 141 then outputs a pixel at (1, 2) input from the image pickup device 11 in the second horizontal line in the Y direction through the output unit 1413a, and stores the pixel in the register 1411a at the same time. That is, the image buffer unit 141 outputs the pixels at (1, 1) and (1, 2) having the same value in the X direction through the output units 1413b and 1413a, respectively.

The image buffer unit 141 stores, in a storage area 1b of the line buffer 1412b, the pixel that has been stored in the register 1411b, at the next timing. The image buffer unit 141 shifts the pixels stored in the storage areas 1a to 639a of the line buffer 1412a to the storage areas 2a to 640a to store the pixels therein, and stores, in the storage area 1a, the pixel that has been stored in the register 1411a. The image buffer unit 141 outputs the pixel at (2, 1) stored in the storage area 640a through the output unit 1413b, and stores the pixel in the register 1411b at the same time. The image buffer unit 141 then outputs a pixel at (2, 2) input next from the image pickup device 11 through the output unit 1413a, and stores the pixel in the register 1411a at the same time.

The image buffer unit 141 shifts the pixel that has been stored in the storage area 1b to a storage area 2b of the line buffer 1412b to store the pixel therein, and stores, in the storage area 1b, the pixel that has been stored in the register 1411b at the next timing. The image buffer unit 141 shifts the pixels stored in the storage areas 1a to 639a of the line buffer 1412a to the storage areas 2a to 640a to store the pixels therein, and stores, in the storage area 1a, the pixel that has been stored in the register 1411a. The image buffer unit 141 outputs a pixel at (3, 1) stored in the storage area 640a through the output unit 1413b, and stores the pixel in the register 1411b at the same time. The image buffer unit 141 then outputs a pixel at (3, 2) input next from the image pickup device 11 through the output unit 1413a, and stores the pixel in the register 1411a.

By repeating the above operation, the image buffer unit 141 simultaneously outputs pixels having the same value in the X direction in the first and the second horizontal lines in the Y direction that are input from the image pickup device 11, through the output units 1413a and 1413b, respectively. At the same time, the image buffer unit 141 stores, in storage areas 639b to 1b of the line buffer 1412b, 1st to 639th pixels in the first horizontal line in the Y direction, respectively, and stores the 640th pixel in the register 1411b. Furthermore, the image buffer unit 141 stores, in the storage areas 639a to 1a of the line buffer 1412a, 1st to 639th pixels in the second horizontal line in the Y direction, respectively, and stores the 640th pixel in the register 1411a.

As the operation described above, the image buffer unit 141 buffers pixels in each horizontal line input from the image pickup device 11 in the line buffers 1412a to 1412d. At the same time, the image buffer unit 141 outputs pixels having the same value in the X direction, that is, pixels at (X, Y-4), (X, Y-3), (X, Y-2), (X, Y-1), and (X, Y), through the output units 1413a to 1413e, respectively at the same timing.

Configuration and Operation of Filter Processing Unit 143

Figure 12:
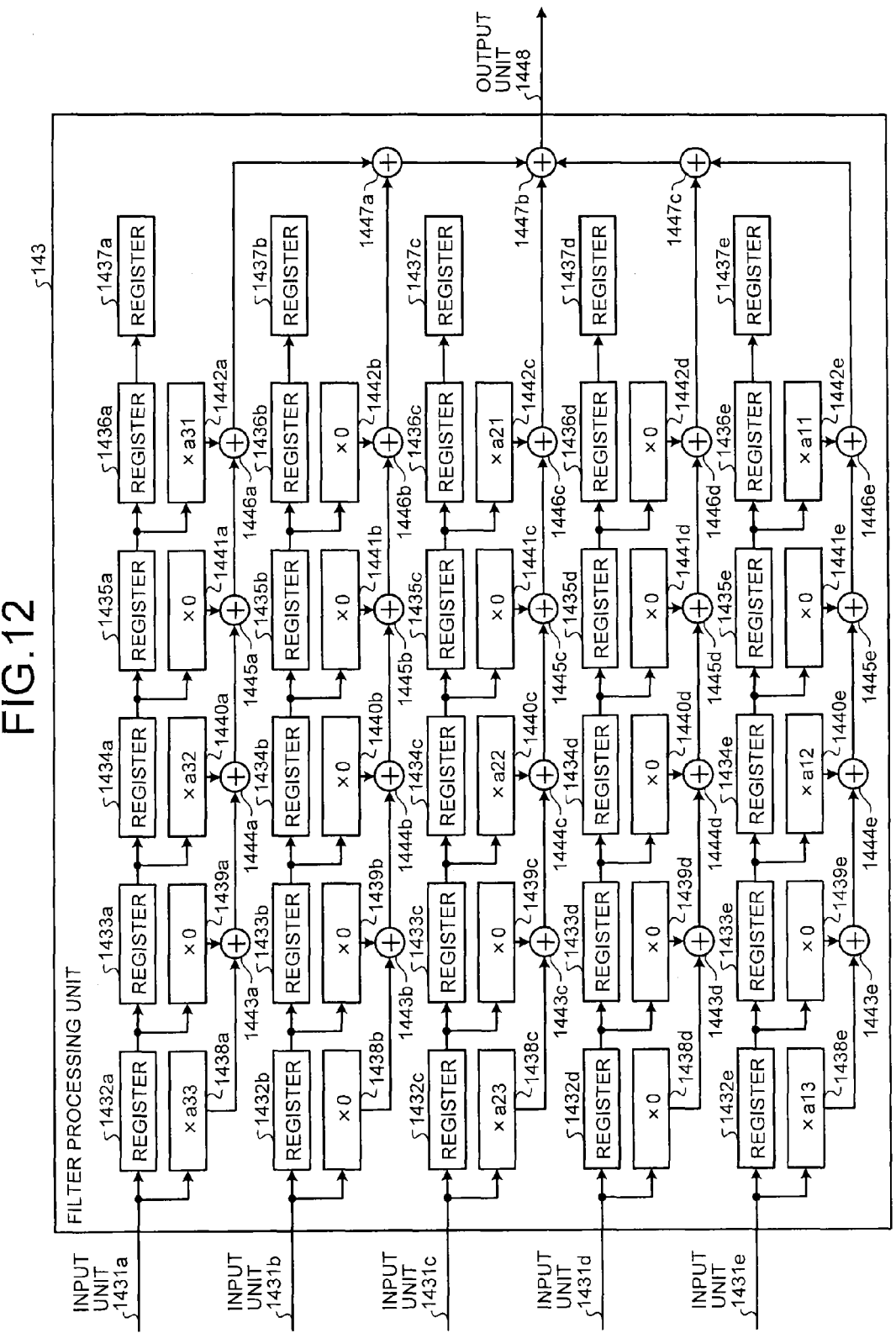
FIG. 12 is a block diagram showing an example of a configuration of a filter processing unit of the restoration processing unit of the embodiment.
Figure 15:
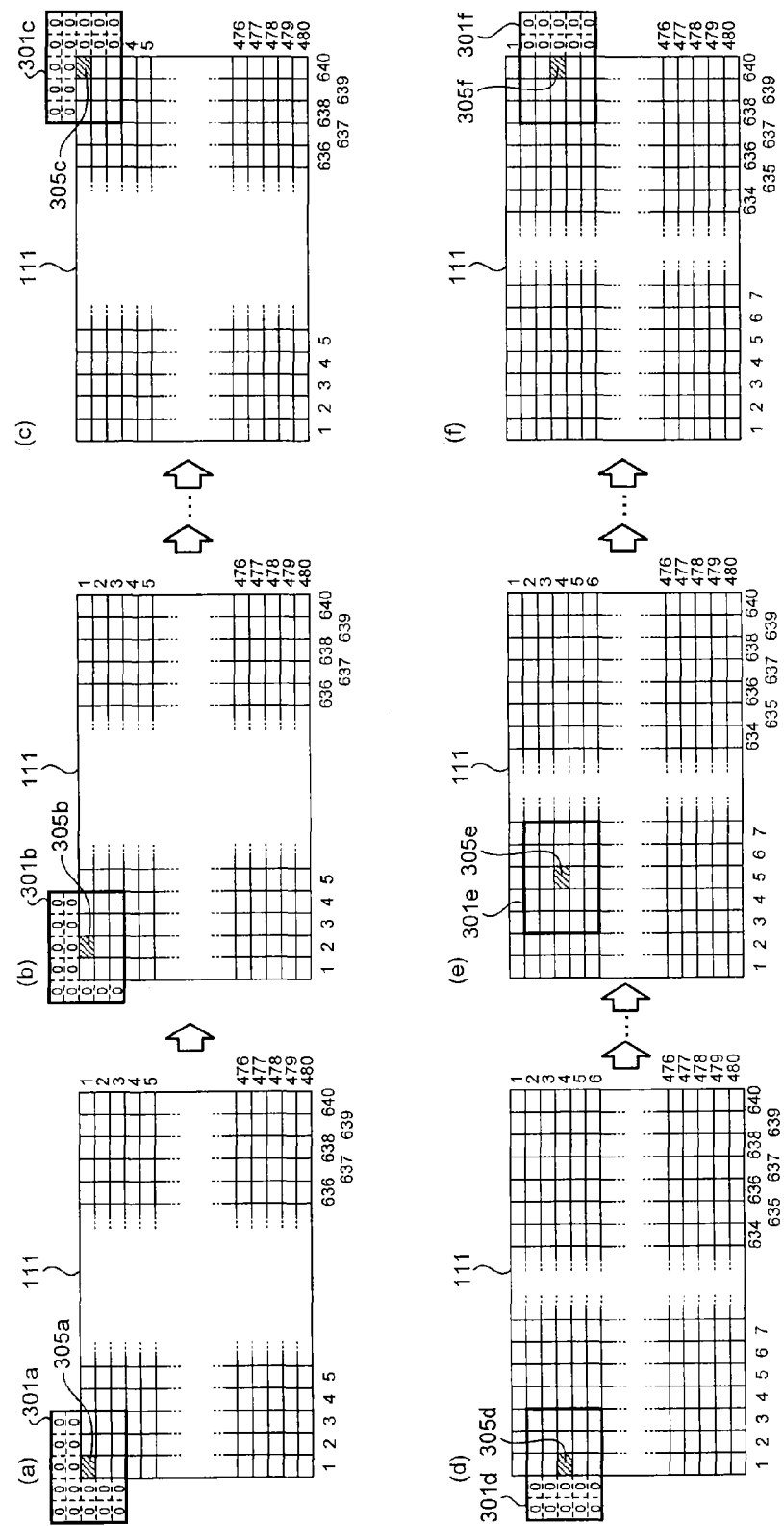
FIGS. 15(a) to 15(f) are explanatory diagrams of operation of scanning a subject partial image to be a subject of the filter processing by the inverse conversion filter.

FIG. 12 is a block diagram showing an example of a configuration of the filter processing unit of the restoration processing unit of the embodiment. FIG. 13 illustrates an example of a configuration of an inverse conversion filter. FIG. 14 is an explanatory diagram of filter processing by the inverse conversion filter. FIG. 15 is an explanatory diagram of operation of scanning a subject partial image to be a subject of the filter processing by the inverse conversion filter. A configuration and operation of the filter processing unit 143 of the restoration processing unit 14 are explained with reference to FIGS. 12 to 15.

As shown in FIG. 12, the filter processing unit 143 includes registers 1432a to 1432e, 1433a to 1433e, 1434a to 1434e, 1435a to 1435e, 1436a to 1436e, and 1437a to 1437e. Moreover, the filter processing unit 143 includes multipliers 1438a to 1438e, 1439a to 1439e, 1440a to 1440e, 1441a to 1441e, and 1442a to 1442e. Furthermore, the filter processing unit 143 includes adders 1443a to 1443e, 1444a to 1444e, 1445a to 1445e, 1446a to 1446e, and 1447a to 1447c. The filter processing unit 143 receives input of a pixel output from the image buffer unit 141 through input units 1431a to 1431e, performs convolution calculation by an inverse conversion filter having a predetermined filter coefficient, and outputs a calculation value through the output unit 1448. The filter coefficient of the inverse conversion filter is constituted of 5×5 coefficients as shown in FIG. 13.

The multipliers 1438a to 1438e, 1439a to 1439e, 1440a to 1440e, 1441a to 1441e, and 1442a to 1442e are circuits that output a multiplication value of a pixel input from the input side and the filter coefficient. Specifically, the multipliers 1438a to 1442a output multiplication values of respective filter coefficients a33, "0", a32, "0", and a31 with pixels. The multipliers 1438b to 1442b outputs multiplication values of "0" with pixels. The multipliers 1438c to 1442c output multiplication values of respective filter coefficients a23, "0", a22, "0", and a21 with pixels. The multipliers 1438d to 1442d output multiplication values of "0" with pixels. The multipliers 1438e to 1442e output multiplication values of respective filter coefficients a13, "0", a12, "0", and a11 with pixels.

The adders 1443a to 1443e, 1444a to 1444e, 1445a to 1445e, 1446a to 1446e, 1447a, and 1447c are circuits that output an addition value of values of two pieces of data input from the input side. The adder 1447b is a circuit that outputs an addition value of values of three pieces of data input from the input side.

As shown in FIG. 12, the input units 1431a to 1431e are connected to input sides of the registers 1432a to 1432e, respectively. The registers 1432a to 1437a are connected in series. The registers 1432b to 1437b, 1432c to 1437c, 1432d to 1437d, and 1432e to 1437e are also the same.

The input units 1431a to 1431e are connected to input sides of the multipliers 1438a to 1438e, respectively. Output sides of the registers 1432a to 1435a are connected to input sides of the multipliers 1439a to 1442a, respectively. Connection relation between the registers 1432b to 1435b and the multipliers 1439a to 1442b, connection relation between the registers 1432c to 1435c and the multipliers 1439c to 1442c, connection relation between the registers 1432d to 1435d and the multipliers 1439d to 1442d, connection relation between the registers 1432e to 1435e and the multipliers 1439e to 1442e are also the same.

Output sides of the multipliers 1438a to 1438e are connected to input sides of the adders 1443a to 1443e, respectively. The adders 1443a to 1446a are connected in series. The adders 1443b to 1446b, 1443c to 1446c, 1443d to 1446d, and 1443e to 1446e are also the same.

Output sides of the multipliers 1439a to 1442e are connected to input sides of the adders 1443a to 1446a, respectively. Connection relation between the multipliers 1439b to 1442b and the adders 1433b to 1446b, connection relation between the multipliers 1439c to 1442c and the adders 1443c to 1446c, connection relation between the multipliers 1439d to 1442d and the adders 1443d to 1446d, and connection relation between the multipliers 1439e to 1442e and the adders 1443e to 1446e are also the same.

Output sides of the adders 1446a and 1446b are connected to an input side of the adders 1447a. Output sides of the adders 1446d and 1446e are connected to input sides of the adders 1447c. Output sides of the adders 1446c, 1447a, and 1447c are connected to an input side of the adder 1447b. An output side of the adder 1447b is connected to the output unit 1448.

Next, the filter processing performed by the filter processing unit 143 is explained with reference to FIGS. 12 to 15. A filter that is used in the filter processing is an inverse conversion filter 201 having 5×5 taps constituted of filter coefficients, a11, "0", a12, "0", and a13; five "0"s; a21, "0", a22, "0", and a23; five "0"s; and a31, "0", a32, "0", and a33. Suppose a part of a process subject image to be a subject of the filter processing by this inverse conversion filter 201 is a subject partial image 211 shown in FIG. 14. The subject partial image 211 is a part of a 5×5 process subject image constituted of pixels A11 to A15, A21 to A25, A31 to A35, A41 to A45, and A51 to A55.

Suppose the registers 1432a to 1432e, 1433a to 1433e, 1434a to 1434e, 1435a to 1435e, 1436a to 1436e, and 1437a to 1437e are in a state in which no data is stored, that is, a state in which a value of "0" is stored. The filter processing unit 143 receives input of the pixels A51, A41, A31, A21, and A11 of the subject partial image 211 from the input units 1431a to 1431e to store in the registers 1432a to 1432e, respectively, and inputs to the multipliers 1438a to 1438e. The multipliers 1438a to 1438e output multiplication values of the input pixels A51, A41, A31, A21, and A11 by respective filter coefficients a33, "0", a32, "0", and a31. The multiplication values calculated by the multipliers 1438a to 1438e are added by the adders 1447a to 1447c. The addition values are output from the adder 1447b, and then output to an external unit outside the filter processing unit 143 through the output unit 1448.

The filter processing unit 143 shifts the pixels A51, A41, A31, A21, and A11 that are stored in the registers 1432a to 1432e to the registers 1433a to 1433e, respectively, to store the pixels therein, and input to the multipliers 1439a to 1439e at the next timing. The filter processing unit 143 receives input of the pixels A52, A42, A32, A22, and A12 of the subject partial image 211 from the input units 1431a to 1431e to store in the registers 1432a to 1432e, respectively, and inputs to the multipliers 1438a to 1438e. The multipliers 1439a to 1439e output multiplication values of the input pixels A51, A41, A31, A21, and A11 by respective filter coefficients "0". The multipliers 1438a to 1438e output multiplication values of the input pixels A52, A42, A32, A22, and A12 by respective filter coefficients a33, "0", a32, "0", and a31. The multiplication values calculated by the multipliers 1439a to 1439e, and the multiplication values calculated by the multipliers 1438a to 1438e are added by the adders 1443a to 1443e, and 1447a to 1447c. The addition values are output from the adder 1447b, and output to an external unit outside the filter processing unit 143 through the output unit 1448.

As a result of repeating the above operation, it is supposed that the pixels A55 to A51, A45 to A41, A35 to A31, A25 to A21, and A15 to A11 are stored in the respective registers 1432a to 1436a, 1432b to 1436b, 1432c to 1436c, 1432d to 1436d, and 1432e to 1436e. Moreover, it is supposed that the pixels A55 to A51, A45 to A41, A35 to A31, A25 to A21, and A15 to A11 are input to the respective multipliers 1438a to 1442a, 1438b to 1442b, 1438c to 1442c, 1438d to 1442d, and 1438e to 1442e. The multipliers 1442a to 1442e output multiplication values of the input pixels A51, A41, A31, A21, and A11 by the respective filer coefficients a31, "0", a21, "0", and a11. The multipliers 1441a to 1441e output multiplication values of the input pixels A52, A42, A32, A22, and A12 by the respective filter coefficient "0". The multipliers 1440a to 1440e output multiplication values of the input pixels A53, A43, A33, A23, and A13 by the respective filter coefficients a32, "0", a22, "0", and a12. The multipliers 1439a to 1439e output multiplication values of the input pixels A54, A44, A34, A24, and A14 by the respective filter coefficient "0". The multipliers 1438a to 1438e output multiplication values of the input pixels A55, A45, A35, A25, and A15 by the respective filter coefficients a33, "0", a23, "0", and a13.

The multiplication values calculated by the multipliers 1438a to 1438e, 1439a to 1439e, 1440a to 1440e, 1441a to 1441e, and 1442a to 1442e are added by a11 the adders shown in FIG. 12. The addition value is output from the adder 1447b, and then output to an external unit outside the filter processing unit 143 through the output unit 1448. This addition value is same as a value obtained by the convolution calculation performed on the subject partial image 211 by the inverse conversion filter 201, that is, a calculation value expressed by Equation (1). The calculation value of the convolution calculation is to be a value obtained by performing the filter processing on center data that is a pixel positioned in the center of the subject partial image 211. That is, the calculation value of the convolution is to be a pixel in the restoration image subjected to the filter processing at a position corresponding to the center data of a process subject image before the filter processing.

Next, for the filter processing performed by the filter processing unit 143, an outline of operation of performing the filter processing while scanning a horizontal line in the X direction in a process subject image 111 is explained with reference to FIGS. 15(a) to 15(f). FIG. 15(a) indicates a state in which the filter processing unit 143 performs the filter processing by the inverse conversion filter 201 on a pixel at (1, 1) in the process subject image 111. As shown in FIG. 15(a), to perform the convolution calculation on the pixel at (1, 1) as center data 305a, a pixel in a part in which a subject partial image 301a having the pixel at (1, 1) as center data and the process subject image 111 overlap with each other is necessary. That is, in the subject partial image 301a, pixels corresponding to the pixels A33 to A35, A43 to A45, and A53 to A55 of the subject partial image 211 shown in FIG. 14 are necessary.

For that, it is necessary that pixels corresponding to the pixels A33 to A35, A43 to A45, and A53 to A55 be output from the output units 1413a to 1413c of the image buffer unit 141. Furthermore, it is necessary that pixels corresponding to the pixels A35 to A33, A45 to A43, and A55 to A53 be stored in the registers 1432c to 1434c, 1432b to 1434b, and 1432a to 1434a of the filter processing unit 143. In addition, a pixels in a portion that is not overlapped with the process subject image 111 is handled as "0" in the subject partial image 301a.

In the above state, the filter processing unit 143 performs the convolution calculation on the subject partial image 301a by the inverse conversion filter 201 similarly to the convolution calculation indicated in FIG. 14. The filter processing unit 143 outputs a value obtained by the convolution calculation performed on the pixel at (1, 1) that is the center data 305a of the subject partial image 301a in the process subject image 111, as the pixel at (1, 1) in a normal image subjected to the filter processing.

Subsequently, the filter processing unit 143 shifts a pixel to be a subject of the convolution calculation in the X direction by one as shown in FIG. 15(b), and performs the filter processing on a pixel at (2, 1) that is center data 305b of a subject partial image 301b. Shifting along the horizontal line in the X direction, the filter processing unit 143 repeats the convolution calculation, and performs the filter processing on a pixel at (640, 1) that is the last pixel in the horizontal line in the X direction. The pixel at (640, 1) is center data 305c of a subject partial image 301c, as shown in FIG. 15(c).

As described above, the filter processing unit 143 repeats the convolution calculation while shifting along the horizontal line in the X direction, and similarly performs the filter processing on a next horizontal line in the Y direction when the filter processing on the final pixel in the horizontal line is finished.

FIGS. 15(d) to 15(f) indicate a state in which the filter processing unit 143 performs the filter processing on pixels in the fourth horizontal line in the Y direction in the process subject image 111. FIG. 15(d) indicates a state in which the filter processing unit 143 performs the filter processing by the inverse conversion filter 201 on a pixel at (1, 4) of the process subject image 111. As shown in FIG. 15(d), to perform the convolution calculation on the pixel at (1, 4) as center data 305d, a pixel in a part in which a subject partial image 301d having the pixel at (1, 4) as center data and the process subject image 111 overlap with each other is necessary. In addition, a pixels in a portion that is not overlapped with the process subject image 111 is handled as "0" in the subject partial image 301d, similarly to the above.

FIG. 15(e) indicates a state in which the filter processing unit 143 performs the filter processing by the inverse conversion filter 201 on a pixel at (5, 4) of the process subject image 111. As shown in FIG. 15(e), an entire subject partial image 301e having the pixel at (5, 4) as center data 305e and the process subject image 111 overlaps with the process subject image 111, and therefore, the filter processing unit 143 is enabled to perform the filter processing using all pixels included in the subject partial image 301e.

Shifting along the horizontal line in the X direction, the filter processing unit 143 repeats the convolution calculation, and performs the filter processing on a pixel at (640, 4) that is the last pixel in the horizontal line in the X direction as shown in FIG. 15(f). The pixel at (640, 4) is center data 305f of a subject partial image 301f, as shown in FIG. 15(f).

As described above, the filter processing unit 143 performs the filter processing by performing the convolution calculation by the inverse conversion filter 201 on each pixel constituting the process subject image 111, and therefore, an image that is made blur by the lens unit 10 can be corrected, and the resolution of the image can be improved.

Moreover, by the inverse conversion filter 201 having the configuration shown in FIG. 13, the filter processing can be performed on respective pixel groups of R (red), Gr (green), Gb (green), and B (blue) of the process subject image 111 arranged in the Bayer arrangement. That is, the filter processing can be performed directly on the process subject image 111 in the Bayer arrangement, and the filter processing can be performed by the common inverse conversion filter 201. Therefore, a circuit configuration of the filter processing unit 143 that performs the filter processing can be made simple.

Furthermore, reduction in resolution of an image generally includes reduction in resolution caused by adding a point spread function picked up by the image pickup device 11, and reduction in resolution caused by the diffraction limit. The diffraction limit is a limit in light collecting power in which when there is no aberration in an optical system, light from one point of a subject is not collected at an infinitesimal point on an image surface, but can only be collected to a limited size having a predetermined radius because light has wave characteristics. The restoration processing described above by the restoration processing unit 14 not only restores reduced resolution due to blurriness caused by a point spread function picked up by the image pickup device 11, but also contributes to restoration of reduced resolution due to diffraction limit.

Although, as for a subject partial image to be a subject of the convolution calculation by the inverse conversion filter 201 in the process subject image 111, a pixel in a portion that does not overlap with the process subject image 111 is handled as "0", it is not limited thereto. For example, for a pixel in a portion that does not overlap with the process subject image 111 in the subject partial image, a pixel when a pixel in a portion that overlaps with the process subject image 111 in the subject partial image is turned back relative to center data of the subject partial image may be used.

Explanation is given specifically using the subject partial image 301a in FIG. 15(a) as an example. Suppose names of pixels of the subject partial image 301a are the same as names of pixels of the subject partial image 211 shown in FIG. 14. In this case, pixels in a portion that does not overlap with the process subject image 111 of the subject partial image 301a are pixels A11 to A15, A21 to 25, A31, A32, A41, A42, A51, and A52. Moreover, pixels in a portion that overlaps with the process subject image 111 of the subject partial image 301a are pixels A33 to A35, A43 to A45, and A53 to A55.

At this time, for the pixels A31, A32, A41, A42, A51, and A52, turning back the pixels in the portion that overlaps with the with the process subject image 111 of the subject partial image 301a relative to the center data, values of the respective pixels A35, A34, A45, A44, A55, and A54 are used. For the pixels A11, A12, A21, and A22, values of pixels having positional relation of point symmetry out of pixels in the portion that overlaps with the process subject image 111 of the subject partial image 301a relative to center data, namely, values of A55, A54, A45, and A44. Each pixel of a subject partial image may also be determined by the method as described above.

Furthermore, although the inverse conversion filter included in the filter processing unit 143 is a filter having 5×5 taps as shown in FIGS. 12 to 14, it is not limited thereto. That is, the number of taps of a filter may be different numbers such as 9×9, 13×13, and 21×21. In this case, to match the number of taps of a filter, it is also required to match the size of a subject partial image. Moreover, so as to provide center data to be a subject of the inverse conversion processing by the filter, the number of taps of a filter is required to be an odd number. Furthermore, because a process subject image to be a subject of the filter processing has the Bayer arrangement, to perform the filter processing on each pixel group of R (red), Gr (green), Gb (green), and B (blue), it is necessary that odd numbered pieces of pixels in the same color be included in the X direction or the Y direction.

Moreover, the inverse conversion filter is preferable to have, for example, 17×17 taps or more. As the number of taps increases, inverse filters can increase a range on an optical axis in which blurriness can be corrected for an image that is made blur by expanding the depth of field by a phase plate. Therefore, by using an inverse conversion filter having a large number of taps, design variation relating to depth of field of a phase plate and a lens can be increase.

Operation of Bayer Interpolation Unit

Next, operation (Bayer interpolation) of the Bayer interpolation unit 15 of the imaging apparatus 1 of the present embodiment is explained.

As described above, each of pixels constituting a 640×480 restoration image that is output from the restoration processing unit 14 expresses either color of R (red), Gr (green), Gb (green), or B (blue). Constituents of 640×480 of the restoration image are referred to as "pixels". As described above, to each pixel of the restoration image output by the restoration processing unit 14, a pixel expressing either one color of R (red), Gr (green), Gb (green), and B (blue) corresponds. Estimation of colors other than the color of a pixel (G (green) and B (blue) if the pixel is R (red)) based on pixels having a single color among pixels therearound is the Bayer interpolation. That is, the Bayer interpolation is processing of associating pixels of three colors of R (red), G (green), and B (blue), not just associating a pixel of a single color to each pixel. Specific operation of the Bayer interpolation is explained.

First, 3×3 pixels relative to a pixel of a subject of the Bayer interpolation in center are considered as a subject of calculation. Subsequently, a pixel in a color (hereinafter, "concerned color") of a target pixel (hereinafter, "center pixel") is associated as it is as a pixel of the concerned color corresponding to the center pixel. For pixels in colors other than that of the center pixel (hereinafter, "other colors"), a mean value of the other colors of eight pixels that surround the center pixel is calculated, and a calculation value is associated as a pixel of other colors corresponding to the center pixel.

It is explained with a specific example, supposing that the restoration image output by the restoration processing unit 14 is constituted of pixels in the Bayer arrangement shown in FIG. 6. Suppose respective pixels constituting the restoration image before the Bayer interpolation are referred to as "R11", "Gr12", "R13", . . . , as shown in FIG. 6.

First, the Bayer interpolation on a pixel corresponding to the pixel R11 is explained. Because only a part can be taken for 3×3 pixels having the pixel corresponding to the pixel R11 in center, the image Gr12, Gb21, and B22 are to be calculation subjects. First, an R (red) pixel corresponding to the pixel associated with the pixel R11 is to be the pixel R11 as it is. Next, a G (green) pixel corresponding to a pixel associated with the pixel R11 takes a mean value of the pixels Gr12 and Gb21 that are the same color among pixels included in the subject of calculation. Furthermore, a B (blue) pixel corresponding to the pixel associated with the pixel R11 is the pixel B22 because B (blue) pixel is only the pixel B22 among the pixels included in the subject of calculation.

Next, the Bayer interpolation corresponding to the pixel R33 is explained. 3×3 pixels having a pixel corresponding to the pixel R33 in center are subjects of calculation. First, an R (red) pixel corresponding to the pixel associated with the pixel R33 is to be the pixel R33 as it is. Next, a G (green) pixel corresponding to a pixel associated with the pixel R33 takes a mean value of the pixels Gb23, Gr 32, Gr 34, and Gb43 that that are the same color among pixels included in the subject of calculation. Furthermore, a B (blue) pixel corresponding to the pixel associated with the pixel R33 takes a mean value of the pixels B22, B24, B42, and B44 that that are the same color among pixels included in the subject of calculation.

By the method described above, the Bayer interpolation is performed by the Bayer interpolation unit 15.

Although the image processing unit 16 is configured to include the Bayer interpolation unit 15, it is not limited thereto, and it may be configured to be achieved the function of the Bayer interpolation externally to the imaging apparatus 1. For example, a restoration image generated by the imaging apparatus 1 is transmitted to the PC 2 through the communication cable 3, and the Bayer interpolation may be performed on the restoration image by an application executed by the PC 2.

Operation to Suppress False Color in Image Processing Unit

Figure 16:
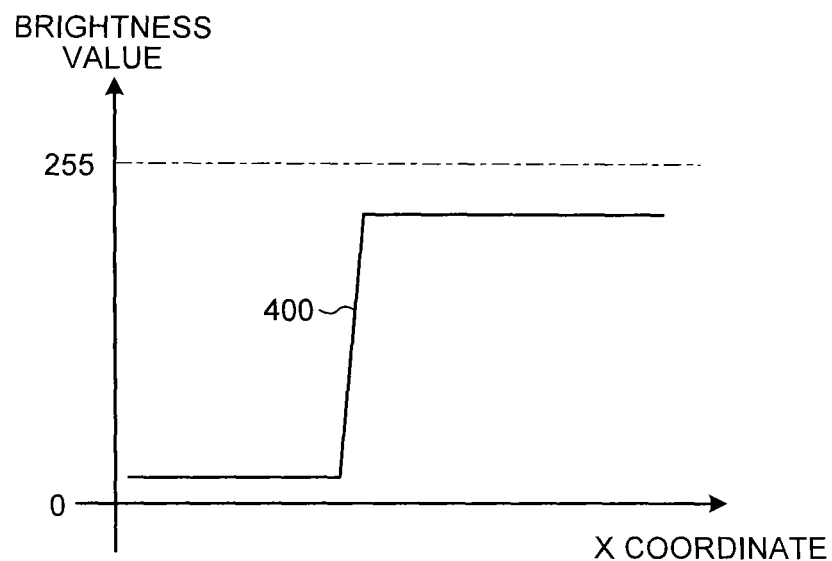
FIGS. 16(a) and 16(b) are diagrams for explaining restoration processing at an edge portion of an image when an accurate light amount is detected.
Figure 16:
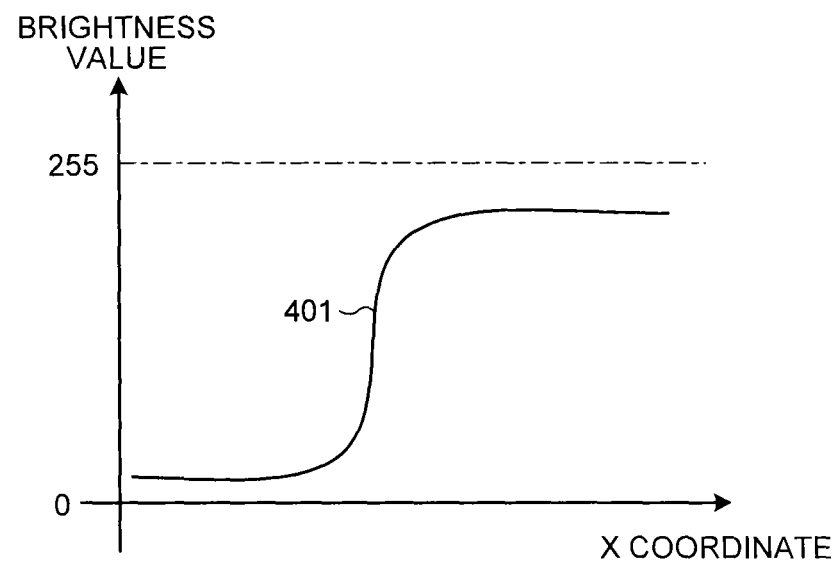

FIGS. 16(a) and 16(b) are diagrams for explaining restoration processing at an edge portion of an image when an accurate light amount is detected. The restoration processing by the restoration processing unit 14 of the image processing unit 16 is specifically explained based on a graph (waveform), with reference to FIGS. 16(a) and 16(b). The restoration processing indicates a series of processing in the buffer processing by the image buffer unit 141 of the restoration processing unit 14, and the filter processing by the filter processing unit 143.

FIG. 16(a) indicates an ideal waveform 400 of brightness (pixel) at an edge portion in a specific direction (X direction in this example) of an ideal image of a subject. FIG. 16(b) indicates a pickup waveform 401 of brightness value (pixel) at an edge portion in a specific direction (X direction in this example) of an image picked up by the image pickup device 11 through the lens unit 10 for light from the subject. The ideal waveform 400 and the pickup waveform 401 may be a waveform of a pixel that is picked up by a detecting device of either R (red), Gr (green), Gb (green), or B (blue). Furthermore, although FIGS. 16(a) and 16(b) indicate waveforms of brightness of an image in the X direction, it is not limited thereto, and it may be considered as a waveform of brightness value of an image in the Y direction, and it is also the same for FIGS. 17(a), (b), (c) to 20(a), (b), (c).

As shown in FIGS. 16(a) and 16(b), because the pickup waveform 401 is a waveform at an edge portion of an image that is blur due to aberration given by the lens unit 10, the pickup waveform 401 is curved at edge portions in the waveform, that is, a state in which variation in brightness is gentle, compared to the ideal waveform 400. When an image having characteristics indicated by this pickup waveform 401 is subjected to the restoration processing, the pickup waveform 401 can be restored to an approximately identical state as the ideal waveform 400.

FIGS. 17(a) to 17(c) are diagrams for explaining the restoration processing at an edge portion of an image when an accurate light amount is not detected. Next, the restoration processing that is performed on an image acquired by picked up by the image pickup device 11, a subject that emits light in a light amount that enables detection by the image pickup device 11 or more is specifically explained based on a graph (waveform), with reference to FIGS. 17(a) to 17(c).

FIG. 17(a) indicates an ideal waveform 410 of brightness value (pixel) at an edge portion in a specific direction (X direction in this example) of an ideal image of the subject. As described above, because the subject emits light in a light amount that enables detection by the image pickup device 11 or more, in a rise of an edge in the ideal waveform 410 (peak), a brightness value becomes larger than a maximum value of a light amount that enables detection by the image pickup device 11 from a middle of the waveform. In FIGS. 17(a) to 17(c), a light amount range (to be exact, a range of values of quantized light amount) enabling detection by the image pickup device 11 is "0" to "255", and the maximum value of the light amount is "255", and it is the same in FIGS. 18(*a*), (*b*), (*c*) to 20(*a*), (*b*), (*c*) described later.

Figure 17:
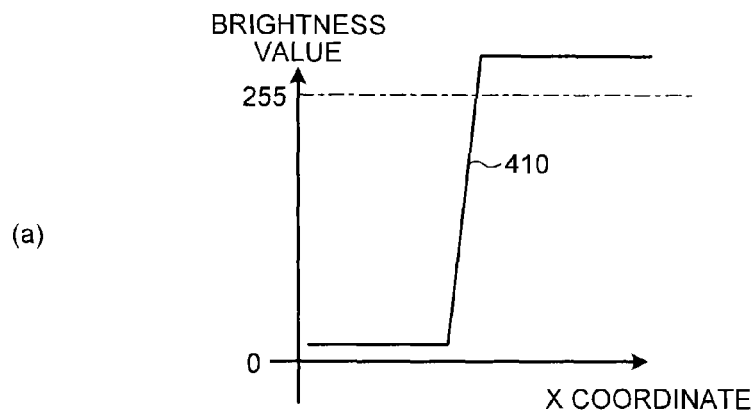
FIGS. 17(a) to 17(c) are diagrams for explaining restoration processing at an edge portion of an image when an accurate light amount is not detected.
Figure 17:
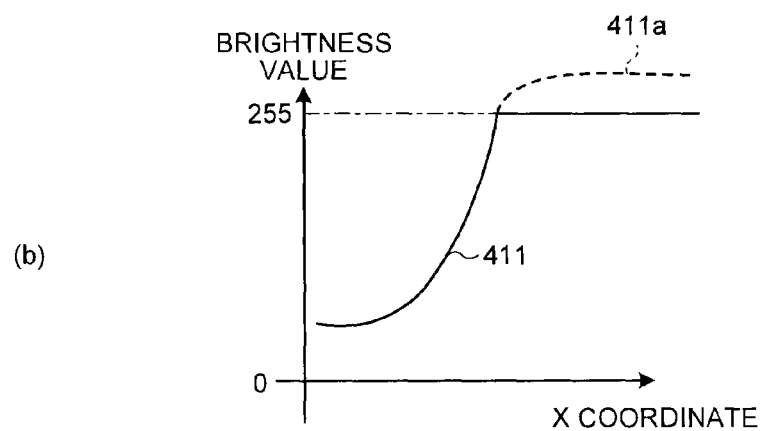
Figure 17:
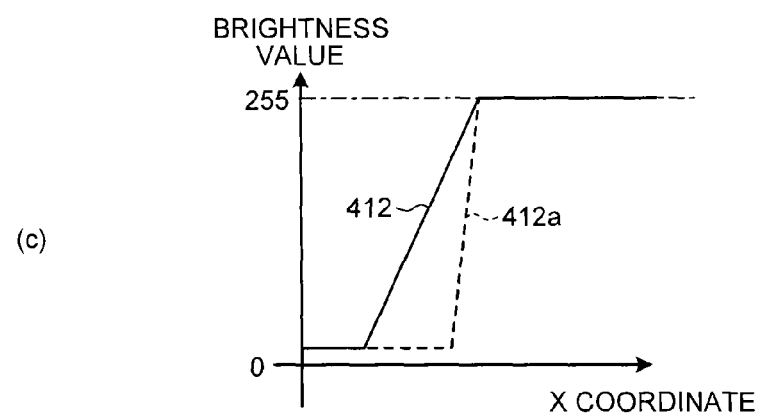

FIG. 17(*b*) indicates a pickup waveform 411 of brightness value (pixel) at an edge portion in a specific direction (X direction in this example) of an image picked up by the image pickup device 11 through the lens unit 10 for light from the subject. However, light from the subject is light in a light amount that enables detection by the image pickup device 11 or more, a light amount cannot be detected when it is larger than the maximum value. Therefore, a brightness value that corresponds to a part of a non-detectable waveform portion 411*a* at which the brightness value is larger than the maximum value is regarded as the maximum value "255". In other words, the pickup waveform 411 does not accurately reflect a waveform of the brightness value that is supposed to be detected by the image pickup device 11.

If an image that includes characteristics indicated by this pickup waveform 411 is subjected to the restoration processing, the pickup waveform 411 is turned into a restoration waveform 412 shown in FIG. 17(*c*). Because the brightness value in the part of the non-detectable waveform portion 411*a* is not accurately reflected in the pickup waveform 411, the restoration waveform 412 is a waveform having a slope gentler than a slope portion of an ideal restoration waveform 412*a* that is a waveform in which the brightness value at the part of the non-detectable waveform portion 411*a* is accurately reflected.

Figure 18:
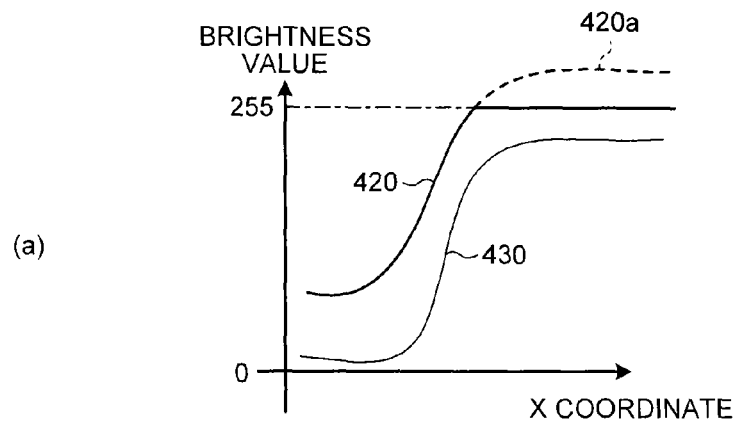
FIGS. 18(a) to 18(c) are diagrams for explaining a case in which white balance processing is performed on a detection image after the restoration processing is performed.
Figure 18:
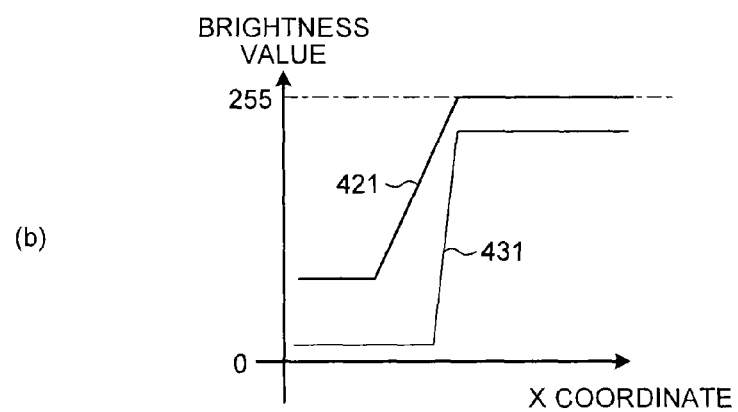
Figure 18:
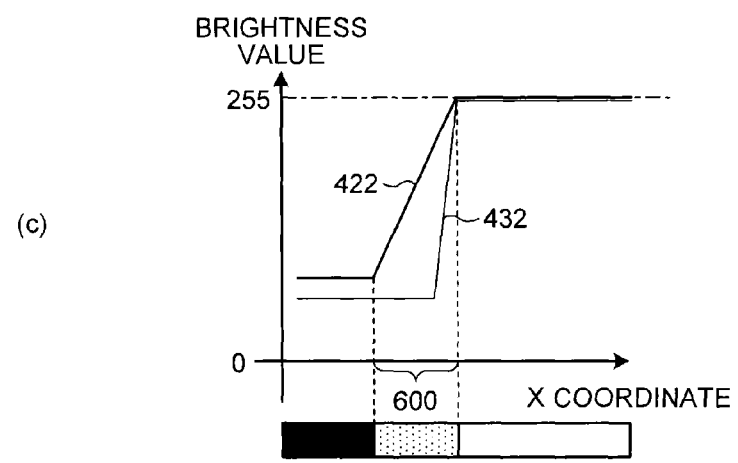

FIGS. 18(*a*) to 18(*c*) are diagrams for explaining a case in which the white balance processing is performed on a detection image after the restoration processing is performed. Next, a case in which the white balance processing is performed on a picked up image after the restoration processing is performed is explained with reference to FIGS. 18(*a*) to 18(*c*).

In the example shown in FIGS. 18(*a*) to 18(*c*), it is supposed that out of light emitted from the subject, a light amount of a part of G (green) light is larger than the maximum value of the light amount that enables detection by the image pickup device 11, and light amounts of R (red) light and B (blue) light are amounts detectable by the image pickup device 11. It is the same in examples shown in FIGS. 19(*a*), (*b*), (*c*) and FIGS. 20(*a*), (*b*), (*c*) described later. FIG. 18(*a*) indicates a pickup waveform 420 of the brightness amount (pixel) of G (green) at an edge portion in a specific direction (X direction in this example) of an image picked up by the image pickup device 11 through the lens unit 10 for light from the subject, and a pickup waveform 430 of the brightness value (pixel) of R (red) or B (blue). As shown in FIG. 18(*a*), because the brightness value becomes larger than the maximum value from a middle of the waveform at a rise (peak) of an edge in the pickup waveform 420 of G (green) light, the brightness value that corresponds to a part of a non-detectable waveform portion 420*a* that is a part of a waveform that is supposed to be formed is regarded as the maximum value "255". In other words, the pickup waveform 420 does not accurately reflect a waveform of the brightness value that is supposed to be detected by the image pickup device 11. On the other hand, the pickup waveform 430 of R (red) or B (blue) light is accurately detected by the image pickup device 11.

FIG. 18(*b*) indicates a waveform that is obtained when the restoration processing is performed in an image that includes characteristics indicated by the pickup waveform 420 and the pickup waveform 430 shown in FIG. 18(*a*). As a result of this restoration, the pickup waveform 420 is turned into a restoration waveform 421, and the pickup waveform 430 is turned into a restoration waveform 431. At this time, because the brightness value (pixel) of the pickup waveform 430 is accurately detected in the restoration waveform 431, a slope portion is restored so as to be approximately the same as a slope portion of the same edge portion in an ideal image of the subject. On the other hand, because the brightness value (pixel) in the portion of the non-detectable waveform portion 420*a* in the pickup waveform 420 is not accurately detected in the restoration waveform 421, the restoration waveform 421 is to be a waveform having a slope portion gentler than the slope portion in the restoration waveform 431.

FIG. 18(*c*) indicates a waveform that is obtained when the white balance processing is performed in an image that includes characteristics indicated by the restoration waveform 421 and the restoration waveform 431 shown in FIG. 18(*b*). As a result of this white balance processing, the restoration waveform 421 is turned into a white balance (WB) waveform 422, and the restoration waveform 431 is turned into a WB waveform 432. For example, in an ideal image of the subject, assuming that a region in which the brightness value of the WB waveform 422 is largest is in an achromatic color (white), in the restoration waveform 431, the peak portion is lifted up so as to be substantially consistent by the white balance processing so that the region is to be in an achromatic color (white), to be the WB waveform 432. Although the WB waveform 422 and the WB waveform 432 should have the slope portions approximately consistent with each other as a result of the restoration processing, because the brightness value of the portion of the non-detectable waveform portion 420*a* is not accurately reflected at the time of imaging by the image pickup device 11, the slope portion of the WB waveform 422 is gentler than the slope portion of the WB waveform 432.

Accordingly, in the image subjected to the white balance processing, the brightness value of the WB waveform 422 that is a waveform of G (green) becomes larger than the brightness of the WB waveform 432 that is a waveform of R (red) or B (blue) in a region 600 that corresponds to the slope portion of the WB waveform 422. Therefore, in the image after the white balance processing, it is supposed to be displayed in an achromatic color in the region 600 if the slope portions of the WB waveforms 422 and 432 approximately coincide with each other. However, because the brightness value of G (green) is larger than the brightness values of R (red) and B (blue), it is displayed in a greenish color, that is, a false color is produced.

Figure 19:
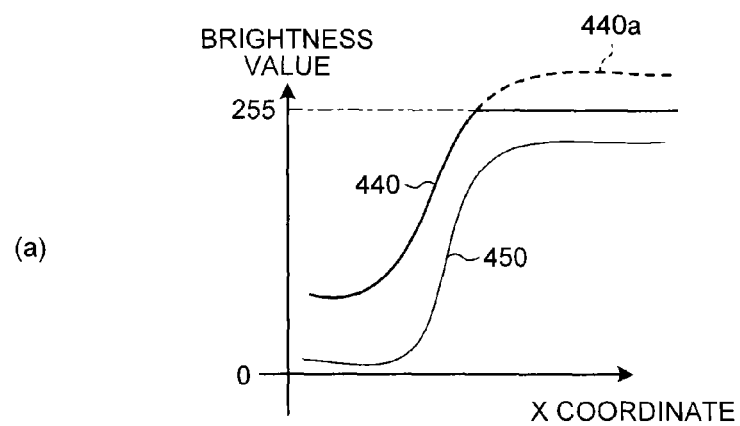
FIGS. 19(a) to 19(c) are diagrams for explaining a case in which the restoration processing is performed without performing value adjustment after the white balance processing is performed on a detection image.
Figure 19:
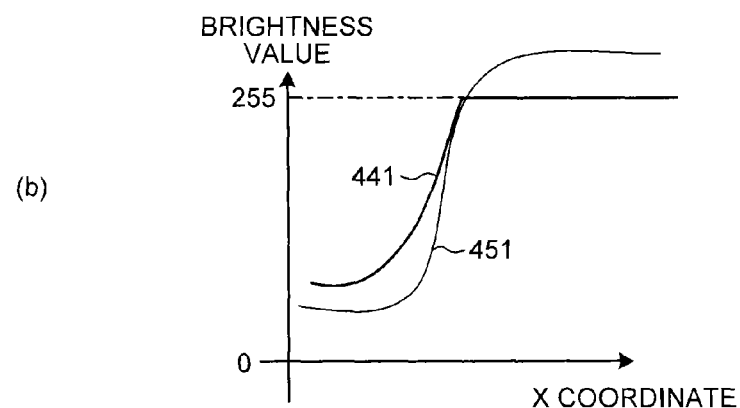
Figure 19:
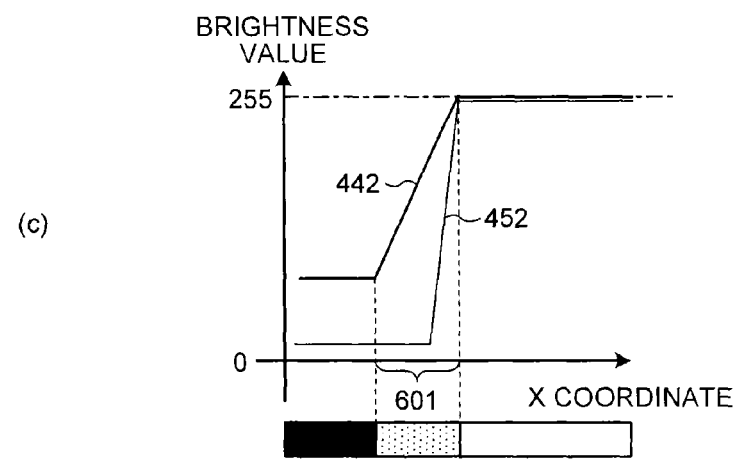
Figure 20:
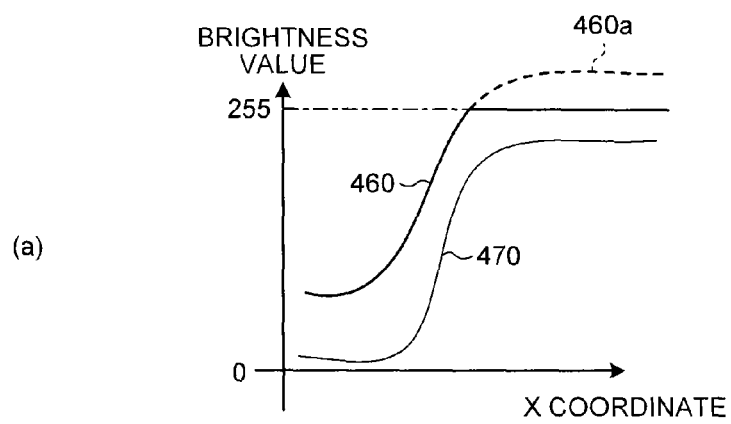
FIGS. 20(a) to 20(c) are diagrams for explaining a case in which the value adjustment and the restoration processing are performed after the white balance processing is performed on a detection image.
Figure 20:
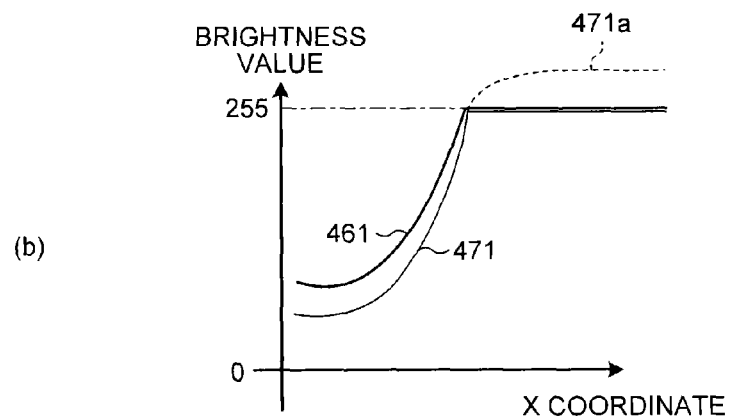
Figure 20:
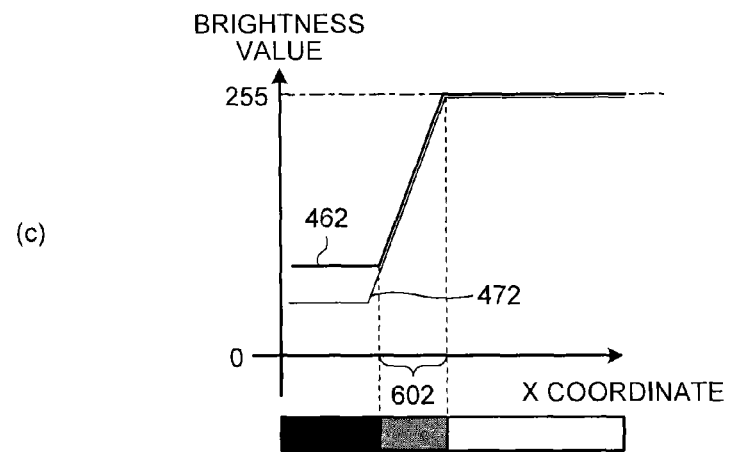

FIGS. 19(*a*) to 19(*c*) are diagrams for explaining a case in which the restoration processing is performed without performing the value adjustment after the white balance processing is performed on a detection image. Next, a case in which the restoration processing is performed without performing the value adjustment after the white balance processing is performed on a pickup image is explained with reference to FIGS. 19(*a*) to 19(*c*).

FIG. 19(*a*) indicates a pickup waveform 440 of the brightness value (pixel) of G (green) at an edge portion in a specific direction (X direction) a pickup waveform 450 of the brightness value (pixel) of R (red) or B (blue). As shown in FIG. 19(*a*), because the brightness value becomes larger than the maximum value from a middle of the waveform at a rise (peak) of an edge in the pickup waveform 440 of G (green) light, the brightness value that corresponds to a part of a non-detectable waveform portion 440*a* that is supposed to be a part of the waveform is regarded as the maximum value "255". In other words, the pickup waveform 440 does not accurately reflect a waveform of the brightness value that is supposed to be detected by the image pickup device 11. On the other hand, the pickup waveform 450 of R (red) or B (blue) light is accurately detected by the image pickup device 11.

FIG. 19(b) indicates a waveform when the white balance processing is performed on an image that includes characteristics of the pickup waveform 440 and the pickup waveform 450 shown in FIG. 19(a). As a result of this white balance processing, the pickup waveform 440 is turned into a WB waveform 441, and the pickup waveform 450 is turned into a WB waveform 451. For example, in an ideal image of the subject, assuming that a region in which the brightness value of the pickup waveform 440 is largest is in an achromatic color (white), the pickup waveform 450 is turned in to the WB waveform 451 in which the peak portion is lifted up so as to substantially coincide with the brightness value of the non-detectable waveform portion 440a shown in FIG. 19(a) by the white balance processing so that the region is to be in an achromatic color (white). Because the white balance processing is calculation processing, as a result of the pickup waveform 450 lifted by the white balance processing, a part of waveform having a value larger than the maximum value is included.

FIG. 19(c) indicates a waveform that is obtained when the restoration processing is performed on an image that includes characteristics indicated by the WB waveform 441 and the WB waveform 451 shown in FIG. 19(b). As a result of this restoration processing, the WB waveform 441 is turned into a restoration waveform 442, and the WB waveform 451 is turned into a restoration waveform 452. At this time, because the brightness value (pixel) of the pickup waveform 450 is accurately detected by the image pickup device 11 and a waveform portion that include a value larger than the maximum value is also maintained as it is even after the white balance processing, the restoration waveform 452 is restored so as to approximately coincide with the slope portion at the same edge portion in the ideal image of the subject. However, because it is necessary to adjust the brightness value to be equal to or smaller than the maximum value of the pixel, the brightness value corresponding to the portion at which the brightness (pixel) value is larger than the maximum value is set to "255" as shown in FIG. 19(c). On the other hand, the restoration waveform 442 has a waveform that includes a gentler slope portion than the slope portion of the restoration waveform 452 because the brightness value at the non-detectable waveform portion 440a is not accurately reflected in the pickup waveform 440.

Accordingly, in an image after the restoration processing, the brightness value of the restoration waveform 442 that is a waveform of G (green) becomes larger than the brightness value of the restoration waveform 452 that is a waveform of R (red) or B (blue) in a region 601 corresponding to the slope portion of the restoration waveform 442. If the slope portions of the restoration waveforms 442 and 452 approximately coincide with each other, the region 601 is displayed in an achromatic color; however, because the brightness value of G (green) is larger than the brightness value of R (red) and B (blue) in the image after the restoration processing, the region 601 is displayed in a greenish color, that is, a false color is produced.

FIGS. 20(a) to 20(c) are diagrams for explaining a case in which the value adjustment and the restoration processing are performed after the white balance processing is performed on a detection image. Next, a case in which the value adjustment is performed by the value adjusting unit 13 and the restoration is performed by the restoration processing unit 14 after the white balance processing is performed by the white-balance processing unit 12 on an captured image is explained with reference to FIGS. 20(a) to 20(c).

FIG. 20(a) indicates a pickup waveform 460 of brightness value (pixel) of G (green) a pickup waveform 470 of brightness value (pixel) of R (red) or B (blue) at an edge portion in a specific direction (X direction in this example) of an image picked up by the image pickup device 11 through the lens unit 10 for light from the subject. As shown in FIG. 20(a), because the brightness value becomes larger than the maximum value from a middle of the waveform at a rise (peak) of an edge in the pickup waveform 460 of G (green) light, the brightness value that corresponds to a part of a non-detectable waveform portion 460a that is a part of a waveform that is supposed to be formed is regarded as the maximum value "255". In other words, the pickup waveform 460 does not accurately reflect a waveform of the brightness value that is supposed to be detected by the image pickup device 11. On the other hand, the pickup waveform 470 of R (red) or B (blue) light is accurately detected by the image pickup device 11.

FIG. 20(b) indicates a waveform when the white balance processing and the value adjustment processing are performed on an image that includes characteristics of the pickup waveform 460 and the pickup waveform 470 shown in FIG. 20(a). As a result of these white balance processing and value adjustment processing, the pickup waveform 460 is turned into a WB waveform 461, and the pickup waveform 470 is turned into a WB waveform 471. For example, in an ideal image of the subject, assuming that a region in which the brightness value of the pickup waveform 460 is largest is in an achromatic color (white), the pickup waveform 470 is to be a waveform in which the peak portion is lifted up so as to substantially coincide with the brightness value of the non-detectable waveform portion 460a shown in FIG. 20(a) by the white balance processing so that the region is to be in an achromatic color (white). However, at this point, the value adjusting unit 13 performs the value adjustment processing to replace the brightness value that corresponds to a value adjustment waveform 471a in which the brightness value is larger the maximum value in the waveform lifted from the pickup waveform 470 by the white balance processing.

FIG. 20(c) indicates a waveform that is obtained when the restoration processing is performed on an image that includes characteristics indicated by the WB waveform 461 and the WB waveform 471 shown in FIG. 20(b). As a result of this restoration processing, the WB waveform 461 is turned into a restoration waveform 462, and the WB waveform 471 is turned into a restoration waveform 472. At this time, because the brightness value of the non-detectable waveform portion 460a is not accurately reflected in the pickup waveform 460, the restoration waveform 462 is to be a waveform having a slope portion gentler than the slope portion at the same edge portion in the ideal image of the subject. Moreover, because the brightness value of a part of the value adjustment waveform 471a is not accurately reflected in the WB waveform 471, the restoration waveform 472 is to be a waveform having a slope portion gentler than the slope portion at the same edge portion in the ideal image of the subject, similarly to the restoration waveform 462.

As a result, although the image is to be a little blur at edges compared to the ideal image of the subject because the slope portions in the restoration waveform 462 and the restoration waveform 472 are gentler than the slope portion of the same edge portion in the ideal image of the subject, the slope portions of the both waveforms approximately coincide with each other in a region 602 corresponding to the slope portion of the restoration waveform 462. Therefore, because the slope portions coincide with each other in the region 602 of the restoration waveforms 462 and 472, the brightness value of R (red), G (green), and B (blue) become approximately identical, the image after the restoration processing is displayed in an original achromatic color of the ideal image, and production of a false color is suppressed.

As described above, the image processing unit 16 of the imaging apparatus 1 according to the present embodiment performs the value adjustment processing to replace a brightness value with a maximum value of a detectable light amount when the brightness value is larger than the maximum value on an image that is obtained by performing the white balance processing on an image picked up by the image pickup device 11. Furthermore, the image processing unit 16 performs the restoration processing on the image subjected to the value adjustment processing. This enables to make slope portions of the brightness value at an edge portion of the image coincide with each other among R (red), G (green), and B (blue), production of a false color in which a specific color is emphasized in display can be suppressed. That is, occurrence of an unbalance state in the restoration processing in which restoration is properly done in one color, while restoration is not properly done in another color can be reduced. Moreover, by suppressing production of a false color, reduction in recognition accuracy in an image processing in a later stage can be suppressed.

Although in the explanation of FIGS. 18(a), (b), (c) to 20(a), (b), (c), a case in which a light amount of G (green) light among light from a subject becomes larger than a maximum value of a detectable light amount of the image pickup device 11 has been explained, it is not limited thereto, and it may be light of R (red) or B (blue). Accordingly, a pixel (brightness value) on which the value adjustment processing is performed is not limited to R (red) or B (blue), and it may be G (green).

According to the present invention, production of a false color can be suppressed at the time of image processing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a white-balance processing unit that multiplies a first pixel that includes a plurality of colors constituting a pickup image that is picked up by an imaging unit by a gain value according to the colors and thereby generates a second pixel;
   a value adjusting unit that generates a third pixel by maintaining the second pixel that is equal to or smaller than a predetermined value out of the second pixel as it is, and by replacing, with the predetermined value, the second value that is larger than the predetermined value out of the second pixel; and
   a restoration processing unit that restores, by a restoration filter, resolution that has been reduced due to an optical system, on the third pixel.

2. The image processing apparatus according to claim 1, wherein
   the first pixel constituting the pickup image is arranged in a Bayer arrangement, and
   the restoration processing unit restores, by a common unit of the restoration filter, the reduced resolution of an image that is constituted by the third pixel arranged in the Bayer arrangement.

3. The image processing apparatus according to claim 1, wherein
   the gain value by which the first pixel corresponding to red and blue is multiplied by the white-balance processing unit is larger than the gain value by which the first pixel corresponding to green is multiplied.

4. The image processing apparatus according to claim 1, wherein
   the restoration filter is an inverse conversion filter to perform inverse conversion processing of a point spread function that is given to the pickup image by the optical system.

5. The image processing apparatus according to claim 1, wherein
   the restoration filter is a finite impulse response filter.

6. The image processing apparatus according to claim 1, wherein
   the restoration processing unit restores reduced resolution due to a diffraction limit by the restoration filter for the third pixel.

7. An imaging apparatus comprising:
   an optical system that makes reduction in resolution uniform in a predetermined range on an optical axis;
   an imaging unit; and
   the image processing apparatus according to claim 1.

8. The imaging apparatus according to claim 7, wherein the optical system gives aberration to incident light.

9. The imaging apparatus according to claim 8, wherein the optical system includes a phase plate on the optical axis.

10. An image processing method comprising:
    performing white balance processing, by a white-balance processing unit, that multiplies a first pixel that includes a plurality of colors constituting a pickup image that is picked up by an imaging unit by a gain value according to the color and thereby generates a second pixel;
    performing value adjustment processing, by a value adjusting unit, that generates a third pixel by maintaining the second pixel that is equal to or smaller than a predetermined value out of the second pixel as it is, and by replacing, with the predetermined value, the second value that is larger than the predetermined value out of the second pixel; and
    performing restoration processing by a restoration processing unit, that restores, by a restoration filter, resolution that has been reduced due to an optical system, on the third pixel.

11. The image processing method according to claim 10, wherein
    at the performing the restoration processing by the restoration processing unit, the reduced resolution of an image that is constituted of the third pixel arranged in the Bayer arrangement is restored, by a common unit of the restoration filter.

12. The image processing method according to claim 10, wherein
    at the performing the white balance processing by the white-balance processing unit, the gain value by which the first pixel corresponding to red and blue is multiplied is larger than the gain value by which the first pixel corresponding to green is multiplied.

13. The image processing method according to claim 10, wherein
    at the performing the restoration processing by the restoration processing unit, the restoration processing is performed on the third pixel that includes uniform reduction in resolution that is given to a predetermined arrangement on an optical axis by the optical system.

* * * * *